US009519425B1

(12) United States Patent
Wood et al.

(10) Patent No.: US 9,519,425 B1
(45) Date of Patent: Dec. 13, 2016

(54) TECHNIQUES FOR DEVICE USER INTERFACES

(75) Inventors: Douglas W. Wood, Westford, MA (US); Timothy J. Cox, Mendon, MA (US); Mark Parenti, Milford, NH (US); Stephen Todd, Shrewsbury, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 1707 days.

(21) Appl. No.: 12/803,470

(22) Filed: Jun. 28, 2010

(51) Int. Cl.
G06F 3/06 (2006.01)

(52) U.S. Cl.
CPC .................................. *G06F 3/0601* (2013.01)

(58) Field of Classification Search
CPC ..... G06F 3/0631; G06F 3/0607; G06F 3/0683
See application file for complete search history.

(56) References Cited

U.S. PATENT DOCUMENTS

| 6,085,227 | A  | * | 7/2000  | Edlund  | G06F 9/54 |
| | | | | | 700/245 |
| 6,167,441 | A  | * | 12/2000 | Himmel  | G06F 17/30905 |
| | | | | | 707/999.104 |
| 6,505,248 | B1 | * | 1/2003  | Casper  | H04L 43/0817 |
| | | | | | 709/217 |
| 7,363,588 | B2 | * | 4/2008  | Saleh   | G06F 17/227 |
| | | | | | 707/E17.006 |
| 7,523,231 | B1 | * | 4/2009  | Gupta   | G06F 3/0605 |
| | | | | | 707/999.009 |
| 7,620,894 | B1 | * | 11/2009 | Kahn    | G06F 3/0481 |
| | | | | | 715/707 |
| 7,792,948 | B2 | * | 9/2010  | Zhao    | H04L 41/046 |
| | | | | | 709/224 |
| 8,032,839 | B2 | * | 10/2011 | Mall    | G06F 3/038 |
| | | | | | 715/707 |
| 8,108,783 | B2 | * | 1/2012  | Emam    | G06F 3/0481 |
| | | | | | 715/705 |
| 8,150,970 | B1 | * | 4/2012  | Whillock | G06F 9/505 |
| | | | | | 709/219 |
| 9,172,768 | B2 | * | 10/2015 | Stefanik | H04L 67/36 |
| 2004/0267965 | A1 | * | 12/2004 | Vasudevan | G06F 17/30905 |
| | | | | | 709/250 |
| 2004/0268125 | A1 | * | 12/2004 | Clark   | G06F 21/6218 |
| | | | | | 713/166 |
| 2005/0262220 | A1 | * | 11/2005 | Ecklund | H04L 67/2823 |
| | | | | | 709/219 |
| 2006/0044106 | A1 | * | 3/2006  | Hirose  | H04L 12/2805 |
| | | | | | 340/3.54 |

(Continued)

OTHER PUBLICATIONS

Remote Storage, Mar. 28, 2003, pp. 1-5 https://technet.microsoft.com/en-us/library/cc759742(d=printer,v=ws.10).aspx.*

(Continued)

*Primary Examiner* — Scott Baderman
*Assistant Examiner* — Mario M Velez-Lopez
(74) *Attorney, Agent, or Firm* — Muirhead and Saturnelli, LLC

(57) ABSTRACT

Described are techniques for data storage management. A proxy agent obtains information regarding a state of one or more data storage systems being managed. The information is communicated by the proxy agent to a first gadget for data storage management on a first device. The first gadget is included in an integrated user interface framework.

20 Claims, 26 Drawing Sheets

(56) References Cited

U.S. PATENT DOCUMENTS

| | | | | |
|---|---|---|---|---|
| 2007/0150857 A1* | 6/2007 | Korkishko | ............ | G06F 21/645 717/106 |
| 2007/0299952 A1* | 12/2007 | Goodman | ............... | H04L 12/24 709/223 |
| 2008/0114873 A1* | 5/2008 | Chakravarty | ....... | G06F 11/3065 709/224 |
| 2009/0015433 A1* | 1/2009 | James | .................... | G08C 17/02 340/12.22 |
| 2009/0113033 A1* | 4/2009 | Long | .................... | H04L 41/046 709/223 |
| 2009/0182844 A1* | 7/2009 | Barton | ............. | G06F 17/30905 709/219 |
| 2009/0327519 A1* | 12/2009 | Thiel | ................... | G06F 11/2025 709/239 |
| 2010/0017536 A1* | 1/2010 | Colvig | ................. | H04L 41/046 709/238 |
| 2010/0198768 A1* | 8/2010 | Zhou | .................... | G06F 9/4446 706/47 |
| 2011/0126134 A1* | 5/2011 | Macken | .............. | G06F 17/3089 715/760 |
| 2011/0126213 A1* | 5/2011 | Macken | ................ | G06F 9/4445 719/313 |
| 2011/0176598 A1* | 7/2011 | Kohout | .................. | G01R 31/02 375/227 |
| 2011/0179104 A1* | 7/2011 | Hakoda | ................ | G11B 27/034 709/203 |

OTHER PUBLICATIONS

How to Enter Proxy Settings in Internet Explorer, Dec. 2008, pp. 1-2 http://www.wikihow.com/Enter-Proxy-Settings-in-Internet-Explorer.*

1&1 Help Center—Log in to windows server, Apr. 22, 2010 , pp. 1-4 https://help.1and1.com/servers-c37684/dedicated-server-windows-c39510/organization-via-control-panel-c39514log-in-to-a-windows-server-via-remote-desktop-a749713.html.*

U.S. Appl. No. 12/215,150, filed Jun. 25, 2008, Parenti et al.

* cited by examiner

TECHNIQUES FOR DEVICE USER INTERFACES

BACKGROUND

Technical Field

This application generally relates to computer systems, and more particularly to techniques used in connection with user interfaces.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring. Such tasks may include, for example, configuring storage for use with an email application. In connection with the configuration processing, tasks may include allocating storage, specifying the logical and/or physical devices used for the storage allocation, specifying whether the data should be replicated, the particular RAID (Redundant Array of Independent or Inexpensive Disks) level, and the like. With such options in connection with performing the configuration, a customer may not have the appropriate level of sophistication and knowledge needed. Also, the particular level of knowledge may vary with each user. A single user's knowledge level may also vary for different applications and/or tasks that the single user may perform. Furthermore, a user may be familiar with a particular interface framework, such as Google Desktop™ or Windows Desktop™, customized for the user.

Thus, it may be desirable to utilize a flexible technique for user interface management and selection providing a level of user interaction which assists customers in connection with performing requests for different tasks. It may be desirable that the technique use a framework customizable for the particular user and provide for a user interface that may vary with the particular user, one or more devices of the user, as well as the knowledge levels of each user when performing different tasks and operations.

SUMMARY OF THE INVENTION

In accordance with one aspect of the invention is a method for data storage management. A proxy agent obtains information regarding a state of one or more data storage systems being managed. The information is communicated from the proxy agent to a first gadget for data storage management on a first device. The first gadget is included in an integrated user interface framework. The method may also include communicating said information from said proxy agent to a second gadget for data storage management on a second device, said second gadget being included in a second integrated user interface framework. The first device may be used by a first user having a first level of expertise and said second device may be used by a second user having a second level of expertise different from said first level. The method may also include selecting a first portion of the information in accordance with the first level of expertise and said first device; and providing, using said first gadget, a first user interface on the first device, said first user interface including said first portion of the information and one or more options in accordance with the first level of expertise. The method may also include selecting a second portion of the information in accordance with the second level of expertise and said second device; and providing, using said second gadget, a second user interface on the second device, said second user interface including said second portion of the information and one or more options in accordance with the second level of expertise. The method may also include installing said first gadget in the integrated user interface framework on said first device; and configuring said proxy agent and said first gadget to manage said one or more data storage systems, said configuring including providing said proxy agent with an address for each of said one or more data storage systems being managed, configuring said first gadget to communicate with said proxy agent by providing said first gadget with an address of a component on which said proxy agent is located, and determining an initial level of expertise for a first user of said first device. A first user may use a plurality of devices including said first device, each of said plurality of devices using a different integrated user interface framework including a gadget installed thereon for data storage system management of said one or more data storage systems. The gadget of each of said plurality of devices may be configured to communicate with said proxy agent. The method may also include storing, in a data container, user information indicating that said first user has a first level of expertise; and providing, for each of said plurality of devices using the gadget of said each device, a customized user interface for the first user in accordance with the first level of expertise and said each device. The method may also include updating said user information to indicate that said first user has a second level of expertise; and providing, for each of said plurality of devices using the gadget of said each device, a customized user interface for the first user in accordance with the second level of expertise. The proxy agent may be included on a server. The proxy agent may be included on at least a first of the one or more data storage systems. The first gadget may be included in a directory on one of said data storage systems. The method may also include updating a current expertise level for said first user from said first level of expertise to said second level of expertise; and in response to said updating the current level of expertise, automatically updating said first user interface on the first device in accordance with the second level of expertise. The first user interface may be updated in accordance with said second level of expertise to include at least one of additional information, a new menu, and a new menu option not otherwise included in said first user interface in accordance with said first level of expertise. The integrated user interface framework may provide a customized and integrated view of information for a user of said first device. The integrated user interface framework may be any of a customizable computing desktop environment, a customizable web page portal, a customizable application interface, and a customizable device user interface. The first user interface may be further customized in accordance with at least one of an application for which data storage system management is performed and an operation or task for which data storage system management is performed. The first user interface may vary in accordance with first user information for said first user, said first user information including said first level of expertise, and one or more of a role associated with said first user, an application for which said first user performs data storage management, and a task or operation which said first user has permission to perform).

In accordance with another aspect of the invention is a system comprising: one or more data storage systems; a first device having a first processor and including a first integrated user interface framework having a first plurality of gadgets installed thereon, said first plurality of gadgets including a first gadget for data storage management of said one or more data storage systems; a second device having a second processor and including a second integrated user interface framework having a second plurality of gadgets installed thereon, said second plurality of gadgets including a second gadget for data storage management of said one or more data storage systems; a computer readable medium including executable code stored thereon for a proxy agent configured to communicate with said one or more data storage systems, to communicate with said first device using said first gadget, and to communicate with said second device using said second gadget; and a memory comprising a data container of user information for a plurality of users, said user information for a first of said plurality of users including a level of expertise of said first user, wherein said proxy agent provides a first user interface in accordance with said level of expertise to said first gadget for said first user when said first user uses said first device, and wherein said proxy agent provides a second user interface in accordance with said level of expertise to said second gadget for said first user when said first user uses said second device. The one or more data storage systems may include a data storage array.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
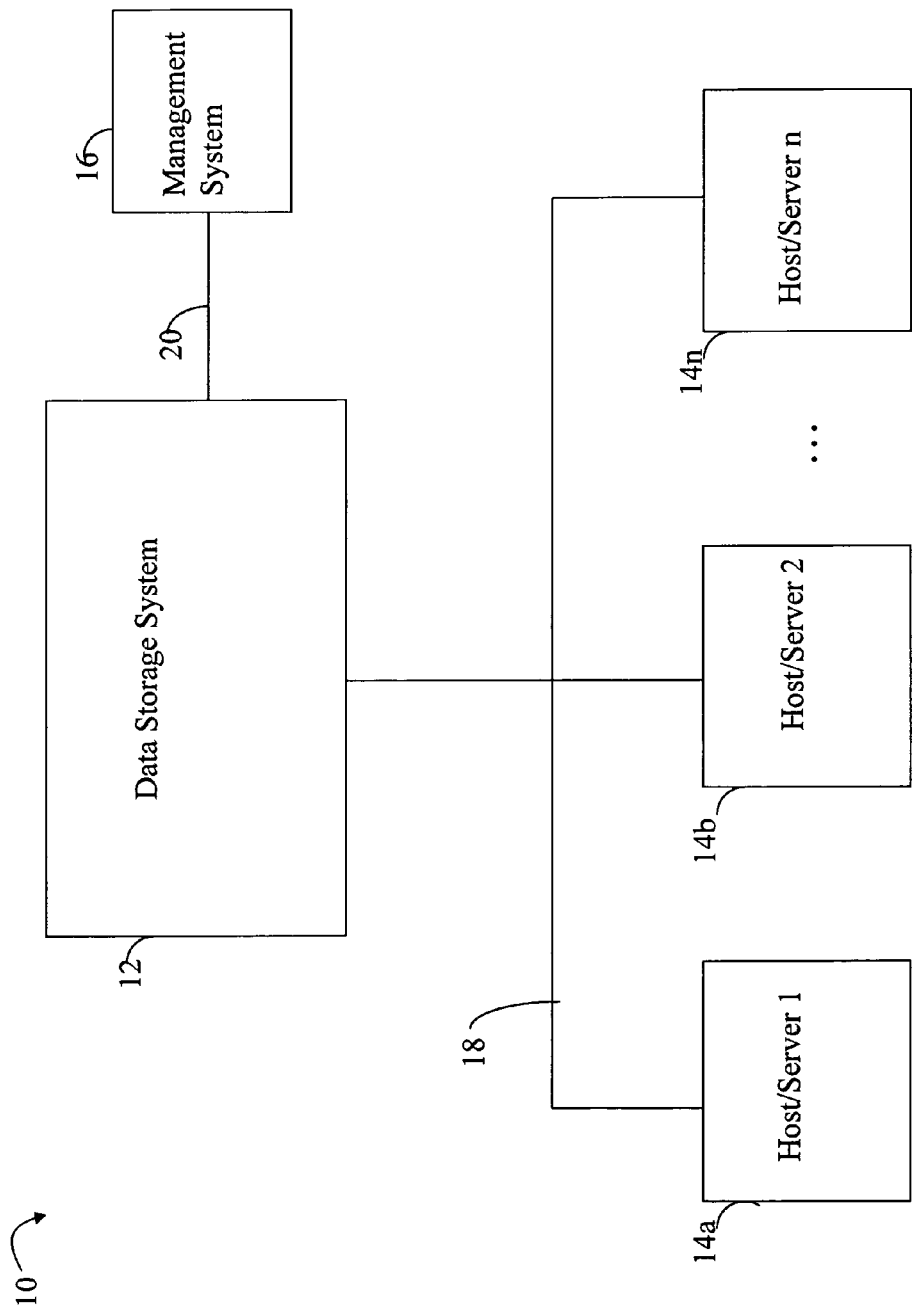
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be a data storage array or an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. Techniques that may be used in connection with performing data storage configuration and configuration tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems, such as a data storage array, may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage configuration request.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in the following paragraphs are techniques that may be used in connection with managing one or more data storage systems from one or more devices using a proxy agent. The one or more devices may include, for example, a desktop or personal computer, mobile phone, or other mobile communication device. More generally, the techniques herein may be used with any suitable device with a processor capable of electronic communications and performing the processing and functionality described herein. The techniques described in more detail in following paragraphs also provide for performing data storage system management using an integrated user interface (UI) framework. As used herein, an integrated UI framework refers to an interface framework providing a customized and integrated view of information and user interaction. Such frameworks may also be referred to as dashboards. Such frameworks provide users with a single interface (e.g., dashboard) through which they can view information from a variety of often disparate sources selected and customized for that user. Examples of such frameworks include, for example, iGoogle™, Google Desktop™, Windows Desktop™, any iPhone™ framework or dashboard, any Android™ framework or dashboard, and the like. Such frameworks may also be provided in connection with an application interface, a personalized or customizable web page or portal, and the like. For example, a user may customize a personal home webpage in a web browser where the page displays user selected information such as daily stock quotes, weather, and the like. As another example, a user may customize an application interface, such as a GUI for a financial application. The financial application may allow the user to customize the application interface such as by retrieving (e.g., from an internet, intranet, or other electronic location) and displaying current interest rates for home loans, business loans, car loans, financial news headlines, electronic news feeds, and the like.

As described herein, an integrated UI framework may be any UI framework providing for integration of one or more customized UIs such as, for example, a customizable computing desktop interface (e.g., such as for a Windows-based operating system), a customizable web page portal (e.g., such as when using a web browser such as Internet Explorer™), a customizable application interface (e.g., such as when using a particular financial application, database application and the like), and more generally any customizable device user interface. An integrated UI framework such as described above may allow for customization using plug-ins, gadgets, widgets, and the like. It should be noted that the term gadget as used herein may generally refer to such objects or elements including widgets, plug-ins, and the like, which allow for customization within an integrated UI framework. For example, the Windows Desktop may be an integrated UI framework on a personal computer running a version of the Windows™ operating system by Microsoft Corporation. A user may install a variety of gadgets on the Windows Desktop such as, for example, to display daily stock or other financial information, display date/time information, display the weather, and the like. In connection with techniques herein, data storage system management may be performed using a gadget installed on an integrated UI framework of a device. Furthermore, an embodiment may provide for data storage management using any one of a variety of supported integrated UI frameworks on one or more devices. Additionally, a user may perform data storage management from multiple devices, such as a mobile phone and a personal computer, where the UI is customized in accordance with a particular user, a level of expertise and/or role associated with the particular user, an application (e.g., email, database, and the like) for which data storage management is performed, a data storage system management task or operation (e.g., provisioning storage, installing software, adding a new physical storage device, configuration data protection such as for RAID, backups, etc.), and/or the particular device being used. Information associated with the user, such as user role and/or level or expertise, affecting various aspects of the UI (e.g., content, menus, menu options, and the like) may be used in connection with any device of that user so that the UI rendered on any such device for data storage system management is in accordance with the user information. In following paragraphs, reference may be made to a particular integrated UI framework, such as for a desktop computing environment, but the techniques are also generally more applicable for use with any integrated UI framework or dashboard.

A gadget may appear as an object located on the integrated UI framework, such as a desktop of a personal computer, and may have interactive capabilities. The gadget may display changing content, such as various images, text, multimedia data, and the like, which change over time or in response to user interaction and selection. In response to a user selection or input, the gadget may also be used to perform an action in accordance with the particular input. Such actions may include, for example, navigating to a particular location such as a website location, launching a program, displaying text and/or images providing information, initiating download and installation of a software component, and the like. In connection with the techniques herein, the gadget may be included in a pane or designated portion of a desktop or other display such as a sidebar. In some embodiments, the sidebar is a pane on the side of the desktop that can be used to organize gadgets.

Gadgets may be characterized as mini-applications, task-specific applets and the like, with a wide variety of uses. In one embodiment, gadgets may be created using a published interface or API with associated routines included in, for example, one or more software developer kits (SDKs) utilizing operating system functionality. Gadgets may be installed and may reside on the local computer or other device including the integrated UI framework. The gadgets may be acquired, for example, when a user downloads them from a website, installs gadgets from a CD or other media such as in connection with an operating system, installs gadgets as an optional update, develops his/her own task-specific gadget such as to perform the techniques herein, and the like.

Each gadget may have the ability to display information and/or respond to user interaction. That interaction may be, for example, the result of clicking within the gadget on buttons, images or text, or by moving the gadget around the screen. In response to the foregoing interaction events, scripts or other technological means may be used to accordingly change the gadget's appearance, perform an operation, display or modify a menu, and the like. Exemplary files used in connection with the gadget may include images, a script (encapsulating the gadget's logic), style sheets as well as an icon used to represent the gadget in a list of available gadgets, and the like. The files associated with a gadget may be included in a separate file or folder. As another example, files associated with the gadget, such as a file written in a scripting or programming language, may contain calls to code included in a proxy agent. For example, the script of the gadget may include one or more calls to routines using a defined API. Each such call of the API may result in a transfer of control to a corresponding routine, body of code, or other entity included in a proxy agent of a management server. The routine or body of code included in the proxy agent may perform a set of processing operations. Those skilled in the art will appreciate that the techniques herein may be implemented utilizing other programming languages and functionality that may be available and vary with each embodiment.

In accordance with techniques herein, the gadget may be used as the UI in an embodiment in accordance with the techniques herein on a device such as computer, mobile phone, or other mobile or electronic device. In accordance with the techniques herein, the gadget may be used in connection with performing data storage system management of one or more data storage systems. The gadget may be used to provide various data storage system state information such as, for example, data storage capacity (e.g., an amount of storage used, free or available), data storage capacity of all managed systems, data storage provisioned for use for one or more particular applications, data storage system health (e.g., any alerts or problems with devices, low storage, low power, down network or other connections, and the like). Furthermore, the gadget may be used to provide information to a user regarding electronic commerce or a particular event of interest, such as related to training, purchase of a new or additional storage devices, user communities, blogs, electronic or other publications of interest, available software and/or hardware for the managed systems (e.g., new version, software patch), and the like. The gadget may provide for displaying information and/or taking an action in response to a user input. For example, the gadget may be used to facilitate navigation to a website or other location in a manner similar to that of a web browser using a hyperlink, initiate processing for downloading and installing software on the device or on a managed data storage system, display menus or text providing information, and the like. The techniques may provide such information and interaction using the gadget of the desk top or other integrated UI framework as described herein.

Figure 1A:
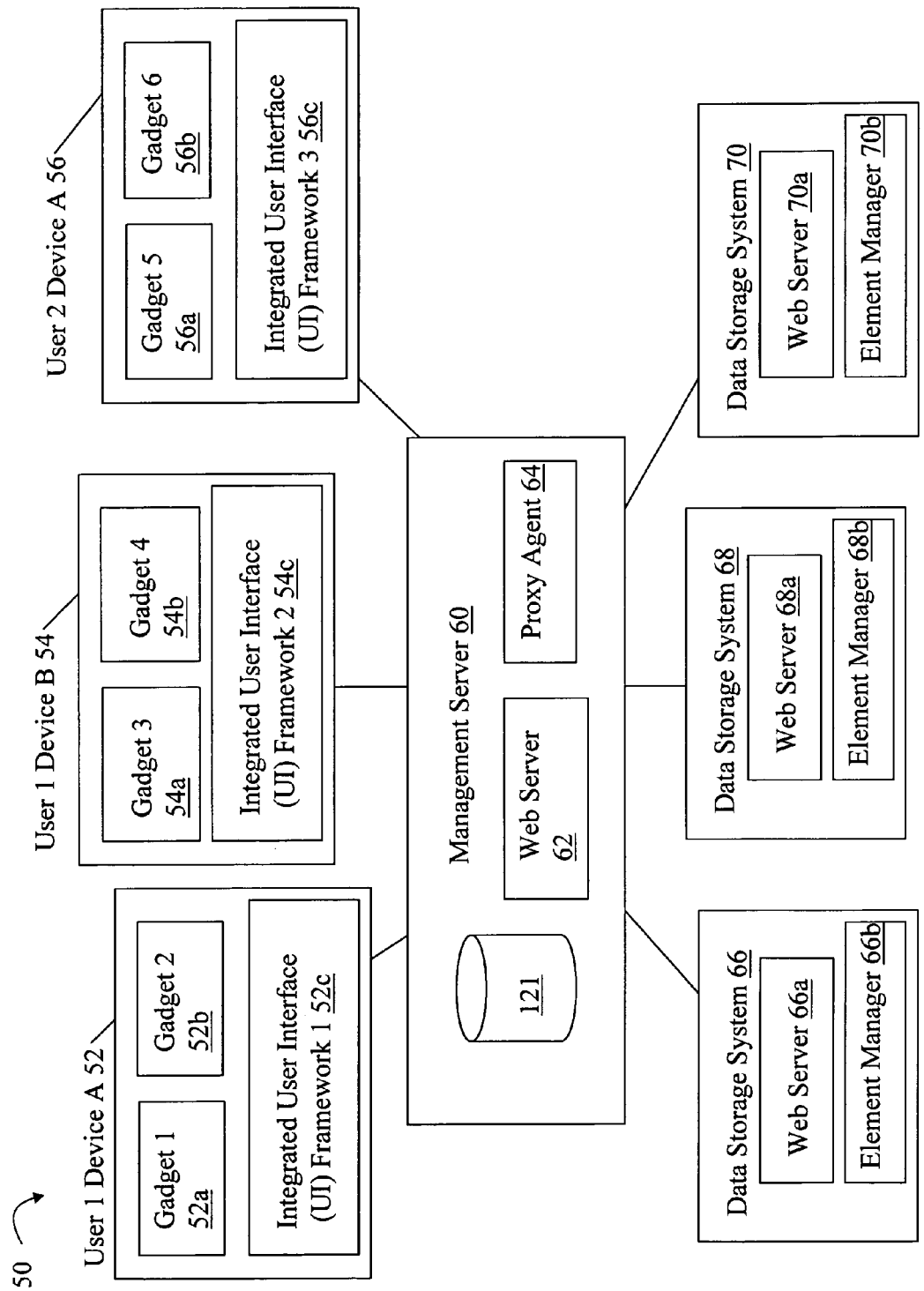
FIGS. 1A and 1B are examples of different architectures and components that may be included in an embodiment in accordance with techniques herein.

Referring to FIG. 1A, shown is an example of an architecture and components that may be included in an embodiment in accordance with techniques herein. The example 50 includes device A for user 1 52, device B for user 1, 54, device A for user 2 56, a management server 60, and three data storage systems 66, 68 and 70. It should be noted that although a particular number of devices, users, and data storage systems are illustrated, the techniques herein may be more generally used with any number and type of the foregoing and are not limited to those described herein for exemplary purposes. User 1 may alternate use of devices 52 and 54 when performing data storage management. User 2 may use a single device 56. Devices 52 and 56 may be, for example, personal computers. Device 54 may be, for example, a mobile phone such as an iPhone™. The management server 60 may be any commercially available or proprietary computing system or device. Each of the data storage systems 66, 68, and 70 may be as described elsewhere herein such as in connection with FIG. 1. In operation, the devices 52, 54 and 56 electronically communicate with, and have connectivity to, the management server 60. In a similar manner, the management server 60 communicates electronically with, and has connectivity to, the data storage systems 66, 68 and 70. The foregoing communication between the components of the example 50 may be over one or more networks, using wired or wireless communications, and the like.

The device 52 includes integrated UI framework 52c and gadgets 52a, 52b. The device 54 includes integrated UI framework 54c and gadgets 54a, 54b. The device 56 includes integrated UI framework 56c and gadgets 56a, 56b. As described above, each of the frameworks 52c, 54c, 56c may be any one of a variety of available frameworks for the particular device. For example, if device 52 is a personal computer running a Windows-based operating system, the framework 52c may be the Windows Desktop. The gadgets, such as 52a, 52b, installed on a device, such as 52, may be used in connection with performing data storage system management as will be described in more detail elsewhere herein.

The management server 60 may include a web server 62, proxy agent 64 and data store or container 121 of user information. The web server 62 may communicate with each of the devices 52, 54 and 56 and also the proxy agent 64. The proxy agent 64 may communicate with the data storage systems 66, 68 and 70 being managed in order to perform data storage system management. For example, proxy agent 64 may retrieve information regarding the systems 66, 68, and/or 70 related to current data storage configuration of physical and/or logical devices, storage provisioned and used by one or more applications, health information regarding the systems such as related to any deficiencies or alerts for devices, fans, power supplies, and the like. The agent 64 may also communicate with the systems 66, 68 and/or 70 to perform data storage management operations such as those which modify, specify or define device configurations, provision additional storage for use by particular applications, install software, initialize a new device, and the like. Element 121 may represent information stored for each particular user. As will be described in more detail below, element 121 may include one or more types of user information such as, for example, user preferences and information generally usable in connection with the techniques herein to provide one or more customized user interfaces for each user. Information of 121 may be used when providing a customized user interface for one or more of the gadgets of a device (e.g., such as 52a of device 52) such as in accordance with one or more of: the level of user expertise, particular user, application for which data storage management is being performed, operation or task being performed, type of device, integrated UI framework, and the like.

As an example in operation, the proxy agent 64 may retrieve information from the systems 66, 68 and 70 regarding the state of the foregoing systems. The information may be obtained in a variety of different ways such as, for example, by agent 64 polling the systems, and/or by the systems reporting information to the agent 64 such as upon the occurrence of an event of interest (e.g., alert regarding a problem, status change, reporting a defined set of information at regular intervals, etc.) The proxy agent 64 and/or web server 62 may then retrieve user information from 121 and perform any processing, filtering, or formatting of such information. Such processing may include, for example, filtering the status information in accordance with the particular user level of expertise so as to only display a portion of the status information relevant to the particular expertise level. For example, a user of device 52 may be a novice user and the data storage system state information may be presented using gadget 52a in relatively simplistic form with no details. The novice user level may be specified in the user information of 121 for user 1. The gadget 52a may display a status of healthy or unhealthy with no further details for a novice user. In contrast, user 2 of device 56 may be an expert having a greater level of expertise than user1. The expert level of user 2 may also be stored in user information of 121. The web server 62 and/or agent 64 may perform processing of the data storage system state information to display additional status information to the expert user2 on device 56. The gadget 56a may display may present additional details regarding the state of the managed data storage systems 66, 68 and 70 in accordance with the expert level of user2. For example, the information displayed using gadget 56a may include more detailed and technical information on any alert or problem which may be understood by user2 but may not otherwise be understood by user 1 having a novice level of expertise. As another example, the gadget 56a may display a menu and/or particular menu options customized for an expert level user. However, such menu and/or menu options may not be presented for a novice user.

After the data storage system state information is processed in accordance with the user information of 121 for a particular user and user device, the web server 62 may communicate the information to the user device. For example, after the foregoing is performed for user 1 on device A 52, the management server 60 communicates the state information to the device 52 for display by gadget 52a. Communications may also be sent from a device, such as the device 52, using the components of the example 50. For example, device 52 may send a request such as in response to a user interaction or input using gadget 52a. In this case, the request may be sent to the web server 62 and proxy agent 64. The web server 62 and/or proxy agent 64 may perform processing for data validation and verification of any requested operation. For example, the web server 62 and/or proxy agent 64 may perform processing to validate any user specified parameters or input values, ensure that a user has appropriate permissions, privileges, etc., to perform any requested operation or task, and the like. The proxy agent 64 may then communicate the request to the appropriate data storage system(s) 66, 68 and/or 70.

The data storage system 66 includes a web server 66a and element manager 66b. The web server 66a may facilitate communications between the proxy agent 64 and the element manager 66b. The element manager 66b may be used in performing processing for a request received from the proxy agent 64, reporting information about the system 66, and the like. The element manager 66b is described in more detail in following paragraphs and figures. Data storage systems 68 and 70 each also include components similar to those of data storage system 66.

The example 50 provides one exemplary architecture and components that may be used in an embodiment in accordance with techniques herein. The example 50 illustrates an architecture with the management server 60 as a single communication point for communications between devices 52, 54 and 56 and the managed data storage systems 66, 68 and 70.

Figure 1B:
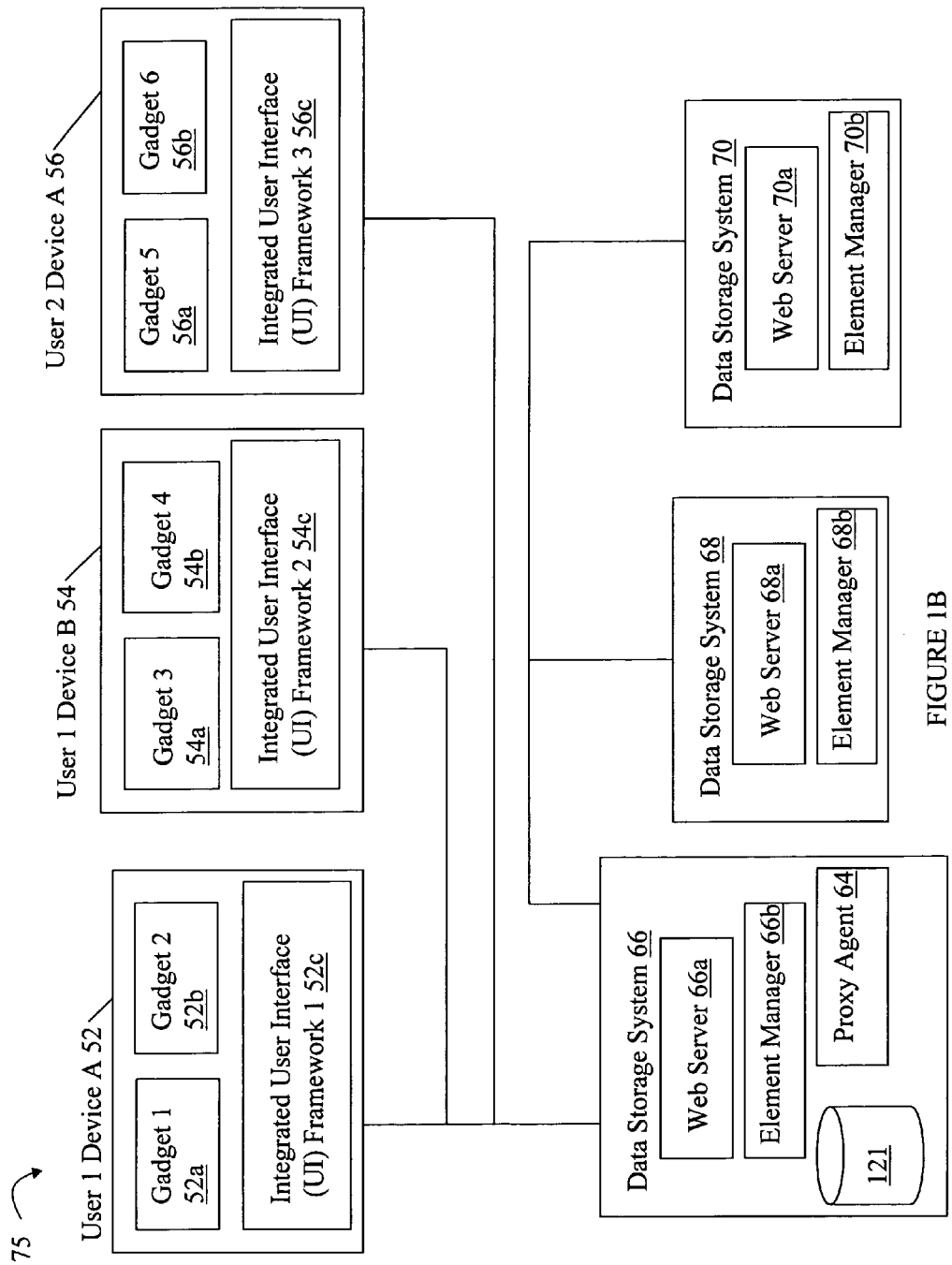

Referring to FIG. 1B, shown is an example of another architecture and components that may be used in an embodiment in accordance with techniques herein. The example 75 includes components similar to those as described and illustrated in connection with FIG. 1A. In contrast to FIG. 1A, FIG. 1B does not include a management server 60. The proxy agent 64 and data container 121 may be included on one or more of the managed data storage systems. As illustrated, the agent 64 and container 121 are included in data storage system 66 but may also be replicated on one or more other data storage systems. In an embodiment in which there is a single proxy agent 64 on data storage system 66, each of the devices 52, 54 and 56 may communicate with the data storage system 66 rather than a management server 60 as illustrated in FIG. 1A. In turn, the system 66 may function as the single communication point facilitating communication between all systems 66, 68, and 70 and the devices 52, 54 and 56. For example, the system 66 may communicate with systems 68 and 70 to obtain any information and perform any operations or requests. The system 66 may also communicate with the devices 52, 54 and 56 to send any information to such devices and/or receive any transmissions from such devices such as in connection with data storage system management.

Figure 2:
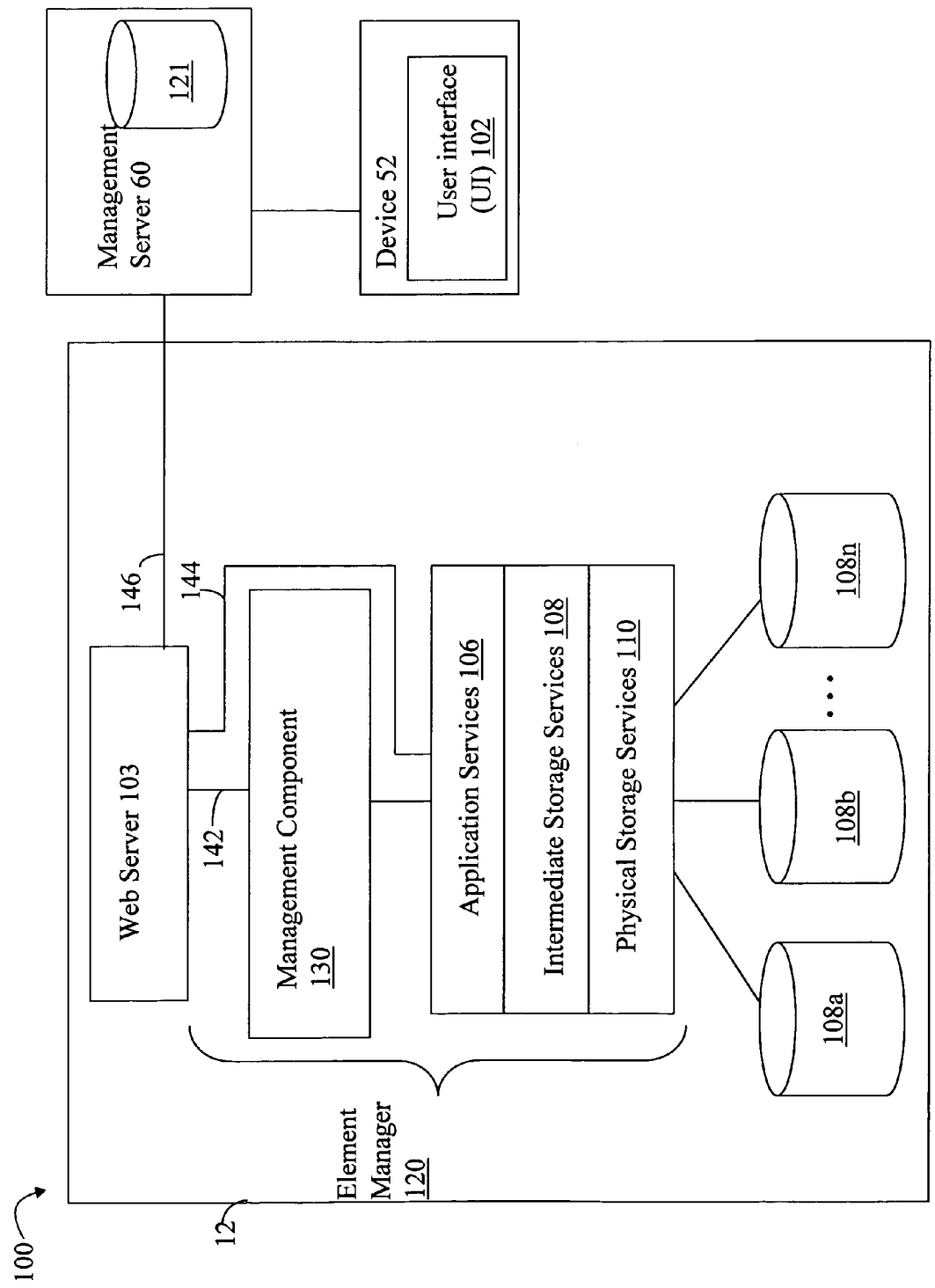
FIG. 2 is an example of components that may be included on the data storage system for use in performing the techniques herein.

Referring to FIG. 2, shown is an example providing additional detail of components that may be included in an embodiment in accordance with techniques herein. The example 100 includes a data storage system 12, management server 60, and device 52 with a user interface (UI) 102. The data storage system 12 may represent one of the data storage systems such as 66 of FIG. 1A. The example 100 illustrates additional detail regarding components that may be included in each data storage system (e.g., each of 66, 68 and 70 of FIGS. 1A and 1B) in accordance with techniques herein. The example 100 also includes the management server 60 and a single device 52 as described in connection with FIG. 1A. The UI 102 may generally represent the UI on any of a variety of different devices (e.g., 52, 54 and 56 of FIG. 1A) as may be used by a user when interacting with the data storage system 12 such as, for example, to perform data management operations. The UI 102 may represent the UI used in connection with user interactions such as described, for example, with the gadgets 52a, 52b in FIG. 1A.

The example 100 includes only a single data storage system 12 and omits additional details regarding the management server 60 and device 52 for simplicity. Also, it should be noted that although the example 100 is in accordance with the architecture of FIG. 1A, the functionality described is also applicable for use with the architecture of FIG. 1B. As described above, the management server 60 may include a web browser and proxy agent used to facilitate communications between the device 52 and the data storage system 12. The management server 60 may communicate with the element manager (EM) 120 of the data storage system 12 such as using a web server 103. The EM 120 may be used to perform operations in connection with management, configuration, monitoring, and the like, of the data storage system. For example, the EM 120 may be used to provision storage used by any one or more different applications such as an email application, a database application, and file server, and the like. As described herein, the EM 120 may also be used to facilitate interactions with environments and locations external to the data storage system 12 and management server 60, such as other computer network locations. In other words, the EM 120 may be used to facilitate communications with other locations and environments external with respect to the data storage system environment in which the data storage system environment may include, for example, one or more data storage systems 12, a SAN, and the like.

The EM 120 includes a management component 130 and one or more layers or levels of services, such as 106, 108 and 110, in connection with implementing a data storage request such as a data storage configuration or data storage provisioning request.

Through the use of components on the management server 60 as described above (e.g., the proxy agent 64 and web server 62), the device 52 may be provided with any one of a variety of different customized user interfaces in accordance with the particular user and user level of expertise or sophistication. The user interface (UI) 102 may provide for one or more different types of user interfaces and associated data. For example, the UI 102 may provide support for a graphical user interface (GUI), command line interface (CLI), and the like, to support interactions between the data storage system 12 and the device 52. The UI 102 may be used to facilitate interactions between the data storage system 12 being managed and a user logged in and using device 52, for example, to perform data management operations. For example, the UI 102 may provide UI data (e.g., content or data used to populate the UI menus), and UI presentation or structure information (e.g., command organization or particular hierarchical menu structure) for use in connection with interacting with the user. This is described in more detail in following paragraphs for use in connection with the techniques herein where the UI may be customized and adapted for use with each particular user, different levels of knowledge and expertise, and/or different desired levels of automation that may be performed in connection with implementing a data storage operation request in accordance with best practices. Information for each particular user may be stored in a location represented by element 121. As will be described in more detail below, element 121 may include one or more types of user information such as, for example, user preferences and information generally usable in connection with the techniques herein to provide one or more customized user interfaces for each user of the data storage system 12. Information of 121 may be used when providing customized UI 102 such as in accordance with one or more of: the level of user expertise, particular user, application for which data storage management is being performed, operation or task being performed, type of device 52, integrated UI framework used with UI 102, and the like.

The management component 130 may be used in connection with facilitating communications between the web server 103 and the different service layers 106, 108 and 110 when performing element management operations. In one embodiment, element management operations may be characterized as those involving interactions with environments and locations internal and/or external to the data storage system environment. Such external environments and locations may include, for example, other network locations and websites as described elsewhere herein. The management component 130 may facilitate a two-way communication flow of information to and/or from the external environments.

In the example 100, the component 130 is represented as a single logical component. However, an embodiment may integrate the operations and functionality of the component 130 with other components included in the EM 120.

It should be noted that there are two paths 142 and 144 illustrated in FIG. 2. The path 142 may be used in connection with those operations involving interactions with environments external to the data storage system and/or involve use of the component 130. The path 144 may be used when performing operations that do not involve the component 130 and/or such interactions with environments external to the data storage system 12. For example, the path 144 may be used in connection with performing a data storage configuration request issued by a user from the management system 16. The path 142 may be utilized if an operation or condition occurs involving the EM component 130 such as when the user requests connection to a website on the Internet for additional information and assistance with respect to an error that occurred as a result of the data storage configuration request.

In the example 100, the EM 120 may include application services 106, intermediate or generic storage services 108, and physical storage services 110. In one embodiment, the user may interact with the UI communicating with any one of the different services 106, 108 and 110. A user may communicate directly with a specific one of the layers 106, 108 or 110. If a user provides an input request and/or data by directly communicating with one of the upper service layers, such as 106, the user request and/or data may be mapped to one or more lower service requests, such as by services of 106 communicating with services of 108 and/or 110 to implement the original input request. By connecting to the different service layers 106, 108 and 110, the UI may provide the user with exposure to different levels of abstraction in connection with performing data storage system management tasks. In one embodiment as described in more detail below, the different service layers may be in accordance with different levels of proficiency and knowledge with respect to performing data storage system management tasks for different applications.

The application services 106 may have an application-specific focus and provide a level of abstraction customized for an application such as, for example, a particular email application, law office application or medical office application, as well as a class of related applications, such as multiple email applications. The application services layer 106 may map the user provided inputs for use by the intermediate storage services 108. When a user interacts with the application services 106 for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application services 106 may use one set of rules or mappings for each application to implement the application specific best practices for the user level. A first set of rules for the medical office application may be used to map the user input parameters using medical office terminology to parameters for the appropriate API calls for other services included in 108 and/or 110. A second set of rules for the law office application may be used to map the user input parameters using law office terminology to parameters for the appropriate API calls for other services 108 and/or 110. The user connecting to the data storage system at the application services 106 may be provided with a user interface customized for the selected level and application to perform a requested data storage configuration.

The intermediate storage services 108 may be an intermediate level. The application services 106 may communicate with the intermediate storage services 108 when implementing a request for data storage configuration. In one embodiment, a user connecting to the intermediate storage services 108 may be provided with a generic level of interaction which may not be tailored for the particular application. In other words, the same language and user interface may be presented to a user for multiple applications such as the medical application or law office application. As a variation to the foregoing, the intermediate storage services 108 may be customized for each application and provide for a more detailed level of exposure that varies per application.

The physical storage services 110 provide the most detailed or greatest level of exposure of the underlying data storage system. The physical storage services 110 may be customized for the particular storage vendor and associated options. For a user connected to the physical storage services, the user interface may include menu options and terms particular to the underlying storage vendor and the more knowledgeable user. For example, the user may specify particular devices, RAID levels and techniques, file types, SCSI and iSCSI terminology, and the like.

As an example in connection with a user making a data storage configuration request and communicating with the application services 106, the user may input data in connection with the request in an application specific context. For example, a user may make a data storage configuration request to configure or provision data storage for a file system or email application. The data input by the user may be in the context of the particular application (e.g., a number of mailboxes, size of mailbox, storage group, and the like). The application-specific data received by the application services 106 may be mapped to one or more application-neutral or generic requests to the intermediate storage services 108. The intermediate storage services 108 may then make one or more calls to the physical storage services 110 to implement requests in the context of the physical storage devices 108a-108n, for example, for the particular data storage vendor and underlying hardware.

Software executed on the data storage system may provide for implementation of best practices for data storage configuration and data services in accordance with each particular application whose data is hosted on the data storage system. Such software may be included in the different service layers, such as 106, 108 and 110, of the EM and are described in more detail below and also in U.S. patent application Ser. No. 11/824,578, filed Jun. 29, 2007 (now U.S. Pat. No. 7,523,231, issued Apr. 21, 2009), APPLICATION AWARE STORAGE, which is incorporated by reference herein. Other techniques for different user levels of expertise are also described, for example, in U.S. patent application Ser. No. 12/215,150, filed Jun. 25, 2008, TECHNIQUES FOR USER INTERFACE SELECTION, Parenti, et al., which is incorporated by reference herein.

In an embodiment using the different service layers, such as 106, 108 and 110 having an application-specific focus with each layer providing a different level of abstraction customized for each application, the UI may provide a user with different levels of exposure to information and requests when performing data storage system configuration and management tasks.

It will be appreciated by those skilled in the art that an embodiment may include different service layers in connection with performing the techniques described herein.

It should be noted that the example 100 is one possible embodiment of the components used in connection with the techniques herein. As illustrated in FIG. 2, the EM 120 is included in the data storage system. In another embodiment using the techniques herein, the EM 120 may be installed and execute on a host or other component connected to the data storage system. In yet another embodiment portions of the EM 120 and/or one or more of the services 106, 108, 110 may be installed and execute on a host or other component connected to the data storage system.

Figure 3:
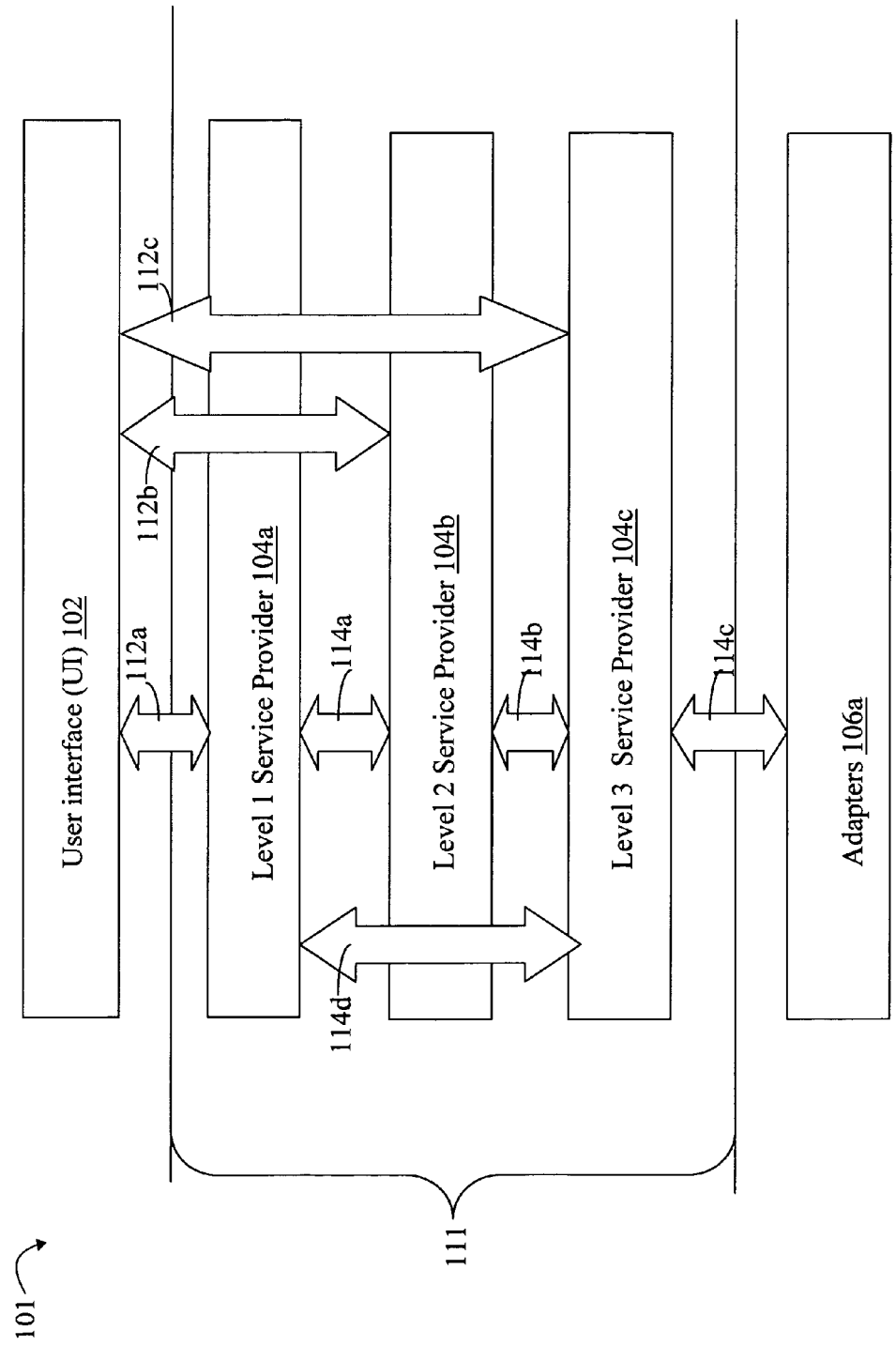
FIG. 3 is an example illustrating the different UI levels.

Referring to FIG. 3, shown is an example representation of components that may be used in performing the techniques herein for data storage configuration and other tasks that may be performed in connection with a data storage system. The example 101 includes the user interface (UI) 102, one or more levels of service providers 111, and adapters 106a. In the example 101, the element 111 includes 3 service provider layers or levels 104a-104c. It should be noted that although 3 service provider levels are shown in FIG. 3, an embodiment may include any number of service provider levels.

It should be noted that the different service providers 104a-104c provide a more generalized representation of 106, 108, and 110 as illustrated and described in connection with FIG. 2.

The adapters 106a are used in connection with facilitating communications between the service providers, such as the level 3 service provider 104c, and other components. The different service providers included in the example 101 may be able to communicate directly with one another. However, when one of the service providers at one of the levels communicates with another component other than one of the service providers, an adapter may be utilized. An adapter may be characterized as a layer of software between one of the service providers, such as service provider 104c, and another component, such as a lower-level component invoked to implement data storage platform specific functionality. An adapter 106a may convert a service provider API to the API of another component. As an example, the service provider 104c may perform a call to an external component to create a file system. An adapter 106a may be used as an intervening layer between 104c and the external component in which the adapter 106a converts the API call from 104c to the API of the external component. The conversion may include, for example, mapping parameters between the API calls, performing multiple calls to the external component for the one API call from 104c, and the like. It should be noted that an adapter 106a may not utilized if such conversion is not needed.

As mentioned above, the user interface (UI) 102 provides for one or more different types of user interfaces and associated data. For example, as mentioned above, the UI 102 may provide support for a graphical user interface (GUI), command line interface (CLI), application programming interface (API), and the like, to support user interactions such as a data storage administrator in connection with performing different tasks. Each of the different service provider levels of 111 may be used in connection with a UI associated with that level to provide a different logical view and level of abstraction with respect to a data storage configuration task to be performed for an application executing on one of the hosts. In connection with the techniques herein, a user may interact through the UI 102 with any one of the different levels of service providers 104a-104c when performing data storage configuration requests. Interfaces used in connection with each of the service providers of 111 may provide a different level of detail or abstraction with respect to the underlying operations and tasks performed on the data storage system in accordance with different levels of user sophistication and knowledge. As will be described in more detail below, the language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In an embodiment, the UI 102 may be characterized as a set of different user interfaces that may vary depending on the target user and associated user level at which the user interacts with the system. As described in more detail in following paragraphs, each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or a minimal amount of automation. The UI 102 may provide multiple different user interfaces in accordance with the different levels allowing a user the option of connecting and interacting with the data storage system at any level. By allowing a user to select a level of interaction and automation, the techniques herein provide a user with a flexible approach to choose deeper levels and entry points (e.g., level 3) providing less automation and more detail as well as selection of other levels (e.g., level 1) when greater automation of best practices is desirable.

For example, level 1 service provider 104*a* may provide a beginner or most simplistic view of the data storage system and tasks performed for data storage configuration. Interaction with the level 1 service provider 104*a* requires the least amount of knowledge and may be geared toward interacting with users having minimal knowledge when performing a data storage configuration request by providing the greatest level of abstraction of the underlying system and operations performed. The language may be more non-technical in comparison to the interface language of other levels. As the level increases, so does the assumed level of knowledge of the user in connection with interactions. Level 3 service provider in the example 101 may be utilized by the most knowledgeable users providing a greatest granularity of control of all levels in connection with a data configuration request. Level 3 exposes more detailed information to the user than interactions at levels 1 and 2. As an example, a level 1 user may issue a data storage configuration request to provision storage for a number of mailboxes for storing data of an email application executing on one of the hosts. The level 1 user may specify a minimal amount of information in connection with the request such as only a number of mailboxes. A user may interface with the data storage system using a GUI and issue the data storage configuration request. The language and terminology of user interactions via the GUI may be customized for the level 1 user of the email application. In connection with the same email application, a more knowledgeable user may choose to issue a data storage configuration request via a GUI for a same number of mailboxes by interacting with level 3 service 104*c*. At level 3, the user provides more detailed information about the request regarding the underlying data storage device and how this data storage device is used by the application. To further illustrate, the level 3 data storage configuration request may specify the physical and/or logical devices upon which storage is allocated, provide vendor-specific attributes or settings, indicate a number and type of file created, and the like. In connection with the type of file created, this may be particular to the email application. A file may be a database or a log file. The log files are used to keep a record of transactions taking place and may be used in connection with recovery operations. The database files hold mailbox stores such as email data. In connection with the user communicating with the level 1 service provider, such detail is not provided and defaults may be specified by the data storage system when implementing the level 1 data storage configuration request. The defaults may be customized for the particular application.

When implementing the request, the level 1 service provider may communicate with one or more other level service providers such as 104*b* and 104*c*. Different defaults for the particular application may be used by service providers 104*b* and 104*c*. For example with reference to the level 1 request for the email application described above, the level 1 service provider 104*a* may communicate with the level 2 service provider 104*b*. Provider 104*b* may then communicate with the level 3 service provider 104*c* to implement the request and allocate the requested storage along with specifying other defaults such as, for example, a default level of data protection. The service provider 104*c* may communicate with other data storage system hardware and/or software when implementing the configuration request.

As illustrated in the example 101, a service provider at a level n may generally communicate, directly or indirectly, with one or more other service providers at levels lower than level n when processing a data storage configuration request. A user may select the level of interaction and the user's data configuration request is received at the data storage system by the UI 102. The UI 102 in turn communicates with the appropriate level service provider to initiate the request. Furthermore, a request received at a first level can result in multiple requests to a lower level to perform an operation. For example, a user may connect to the data storage system 12 at level 1 104*a*. In response, the level 1 service provider 104*a* may issue more than one request to provider 104*b*. In turn, each request to provider 104*b* may result in one or more requests to provider 104*c* which, in turn, communicates with adapters and other code modules to perform the requested operation.

The data storage configuration request may identify the user (e.g., by user identifier or other authentication information), the application for which the request is being made, and any user selections or input parameters.

In one embodiment, the service providers 104*a*-104*c* may be code modules which are included in the same appliance. Each of the service providers 104*a*-104*c* may provide a published interface or API (application programming interface). A first service provider at level n may issue a request of another lower level service provider by issuing an API call to the lower level service provider. The API may also be used to facilitate communications between the UI 102 and the different level service providers of 111. As described in more detail in following paragraphs, an API call from a first service provider to a second service provide may use rules or mappings to map the data received by the first service provider to the appropriate API call with parameters and any defaults in accordance with the received data. Thus, the rules or mappings may be used to map between levels of abstractions of the different service providers.

Although an embodiment may have all service providers 111 located in the same appliance or other component, the service providers may be characterized as remotable. One or more of the service providers may be located on different components having connectivity so that the API calls between service providers may be remote API calls as well as local API calls (e.g., service providers on same component). As an example, an embodiment may have multiple data storage systems included in a network. Each of the service provider may be located on a different data storage system.

An embodiment may determine the level at which a user interacts with the system using a variety of different techniques. With reference to FIG. 3, a user may be allowed to interact at any of the 3 levels. The menus may be directed to a level 1 user. The user may select whether to interact at a lower level by selecting further detailed menu options providing more detailed information at lower levels. As a variation, a user may have associated roles or permissions. If the user does not have the associated roles or permissions to perform operations or view such detailed information associated with particular levels, the associated menu options, wizards, and the like, may not be displayed or may otherwise be disabled when interacting with the particular user.

As a variation to the foregoing, the levels exposed to a user may be limited in that a user may not be allowed to interact with one or more lower levels. For example, user interaction with the data storage system may start at level 1 and provide wizard or other menu options for more detailed selection by the user for level 2. However, information and interactions at level 3 may never be exposed if the product is intended only for a certain level of users or a particular target market. In other words, the capability to drill down and interact may be limited to only levels 1 and 2 but not level 3.

As will also be described in more detail below, an embodiment may also utilize user preferences to determine the initial or default level of interaction and exposure. For example, user preference settings stored on the data storage system or on the host may specify a default level used for the user interface menus, language, and the like. No further detailed buttons or drill down capabilities may be provided via the interface unless the user changes his/her preferences and selects to apply such preferences. In such an embodiment, the user interface may be presented from a viewpoint of the user preferences having content, structure and an interface language/terminology in accordance with the selected level. The user preferences may be stored as configurable parameters or options on the appliance or remotely located, such as on the host, workstation for use with a browser, and the like. For example, the configuration file for the users may be stored on the host or workstation having a web browser. Code executing on the host or workstation may read the configuration file and communicate the preferences to software on the appliance or other data storage system providing data for populating and presenting the user interface. A user may change the preferences via menu options, directly editing a configuration file, and the like. As a user gains experience and knowledge, a user may select to interact at a lower level for some or all requests. As will also be described below, an embodiment may provide for automatically adjusting the UI and level at which a user interacts at a first point time based on one or more user interactions prior to the first point in time.

Figure 4:
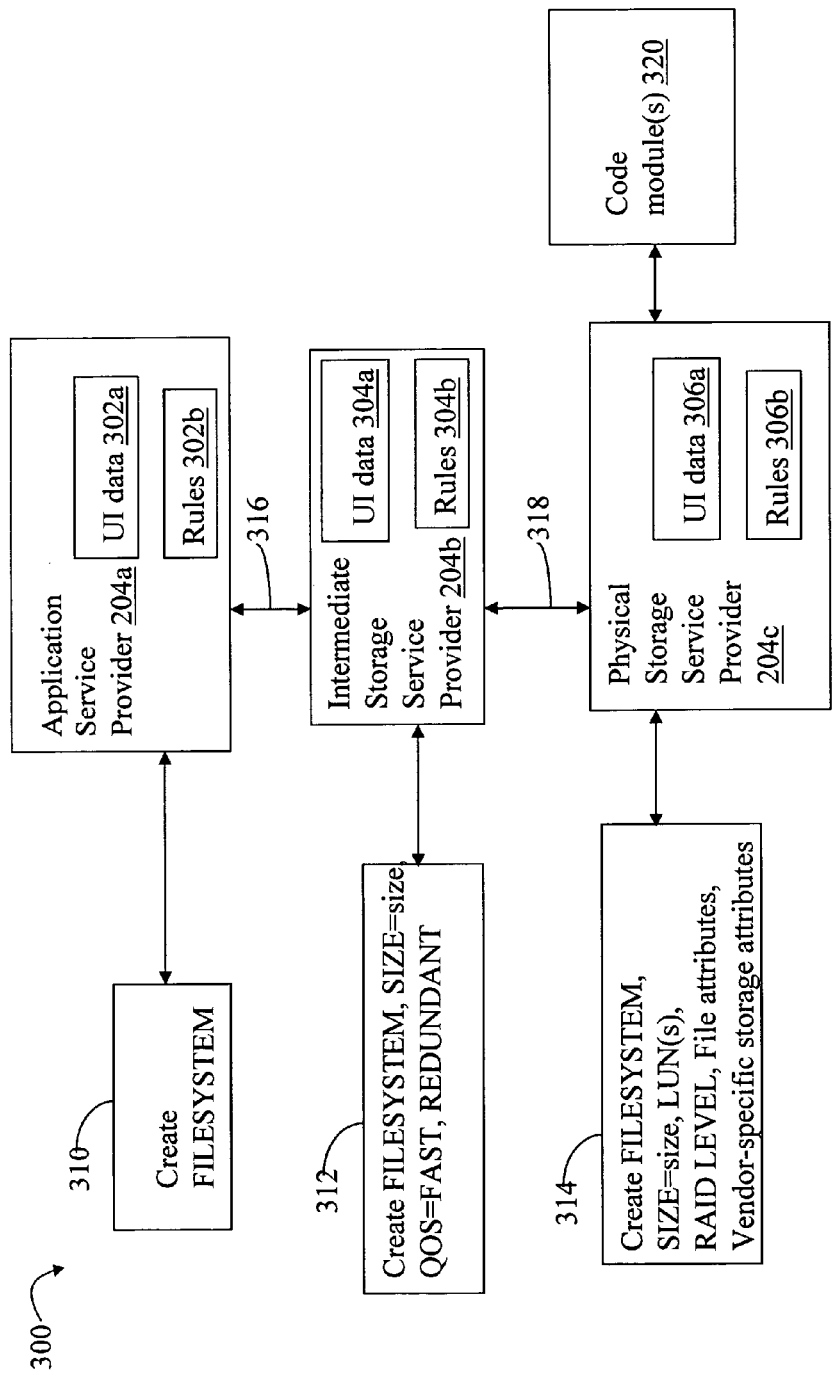
FIGS. 4 and 5 are more detailed examples illustrating information that may be associated with each UI level in connection with a request to create a file system and provision storage for the file system.

Referring to FIG. 4, shown is an example illustrating how the different service providers of FIG. 2 may be used to perform the mapping between levels to perform a data configuration request, and also provide different levels of user interaction.

Elements 204a, 204b, and 204c correspond to the different levels of service providers described in connection with FIG. 3. Elements 310, 312 and 314 represent the information obtained via the UI at the various levels and service providers. Element 310 represents the information obtained for a user connected at level 1 to service provider 204a. Element 312 represents the information obtained for a user connected at level 2 to service provider 204b. Element 314 represents the information obtained for a user connected at level 3 to service provider 204c. Information obtained by a user at level n may be subsequently passed on via an API call to one or more other lower level (e.g. greater than n) service providers in order to perform the user request.

Element 312 may also represent the information communicated by the service provider 204a after the provider 204a applies mapping rules 302b to 310 resulting in an API call of the form as illustrated in 312. Element 314 may represent the information communicated by the service provider 204b after the service provider 204b applies mapping rules 304b to 312 resulting in an API call of the form as in 314

With reference to the example 300, if a user interacts with the system at level 1, the application service provider 204a obtains the data included in 310 which is passed on in form 312 to provider 204b as illustrated by 316. Provider 204b in turn maps data from form 312 to the form of 314 to provider 204c as illustrated by 318. If a user interacts with the system at level 2, the intermediate service provider 204b obtains the data included in 312 and passes the data of 312 to provider 204c in the form represented in 314. If a user interacts with the system at level 3, the physical storage service provider 204c obtains the data from the UI in the form 314. In this example, the provider 204c may implement or execute the one or more operations to perform the request indicated by 314 by invoking one or more other code modules 320. The code modules 320 may communicate with other components on the data storage system to perform the requested task.

In one embodiment, the UI 102 of FIGS. 2 and 3 may query each service provider to obtain the appropriate UI data 302a, 304a and 306a via API calls in accordance with a user selected or specified level of interaction using any one of a variety of different techniques as described herein and known to those skilled in the art. The UI data 302a, 304a and 306a may be used to populate the menus and other UI elements that may be displayed to a user in accordance with the particular level of user interaction for that particular user.

The example 300 illustrates the user inputs for creating a file system for an application with interactions at the various levels 1-3. Element 310 illustrates the input received from the most basic user level 1 in which the user may enter a command to create a particular file system. The file system created with user level 1 interactions uses all default options specified via mapping rules and API calls to levels 2 and 3. For level 2, the parameters input from the user or received via mapping and an API call from level 1 are illustrated in 312. By default, parameters related to size (e.g., SIZE=size), device speed, (e.g., QOS=FAST, wherein QOS is "quality of service") and data protection (e.g., REDUNDANT) are specified. At level 2, there is a level of abstraction from the underlying data storage system but the attribute characteristics may be specified. For level 3, the parameters input from the user or received via mapping and an API call from level 2 are illustrated in 314. At level 3, details regarding the underlying data storage system, such as devices, RAID levels, vendor-specific attributes, which file system (e.g., NFS, CIFS) or block storage, and the like, are specified. For example, level 2 indicates that storage for the file system is to be located on a FAST device. Level 3 mapping rules map the abstract FAST attribute to the particular device (e.g., LUN(s) on the data storage system that may be characterized as FAST with respect to other data storage devices). As more physical devices and/or logical devices added which are also FAST, different LUNs may be used and specified by the mapping rules 304*a* without any change in the data of 312. Thus, data obtained from users interacting at level 1 and 2 need not change as the underlying data storage system changes when devices are added/removed.

In connection with the bottom most level service provider 204*c* or service provider associated with the greatest level of user knowledge and detail, 204*c* may optionally not include and utilize rules 306*b*. An embodiment may have the language of the user interface map directly with low level calls to code modules to implement the request. In other words, the language terms and parameter values specified by the user at level 3 may not require mapping in order to be utilized by the system.

As will be appreciated by those skilled in the art, the examples, such as those of FIG. 4 and following, may be simplistic for purposes of illustration of the techniques herein. At lower levels, there may be greater amounts of detail and complexity in order to provide automation of the best practices.

Figure 5:
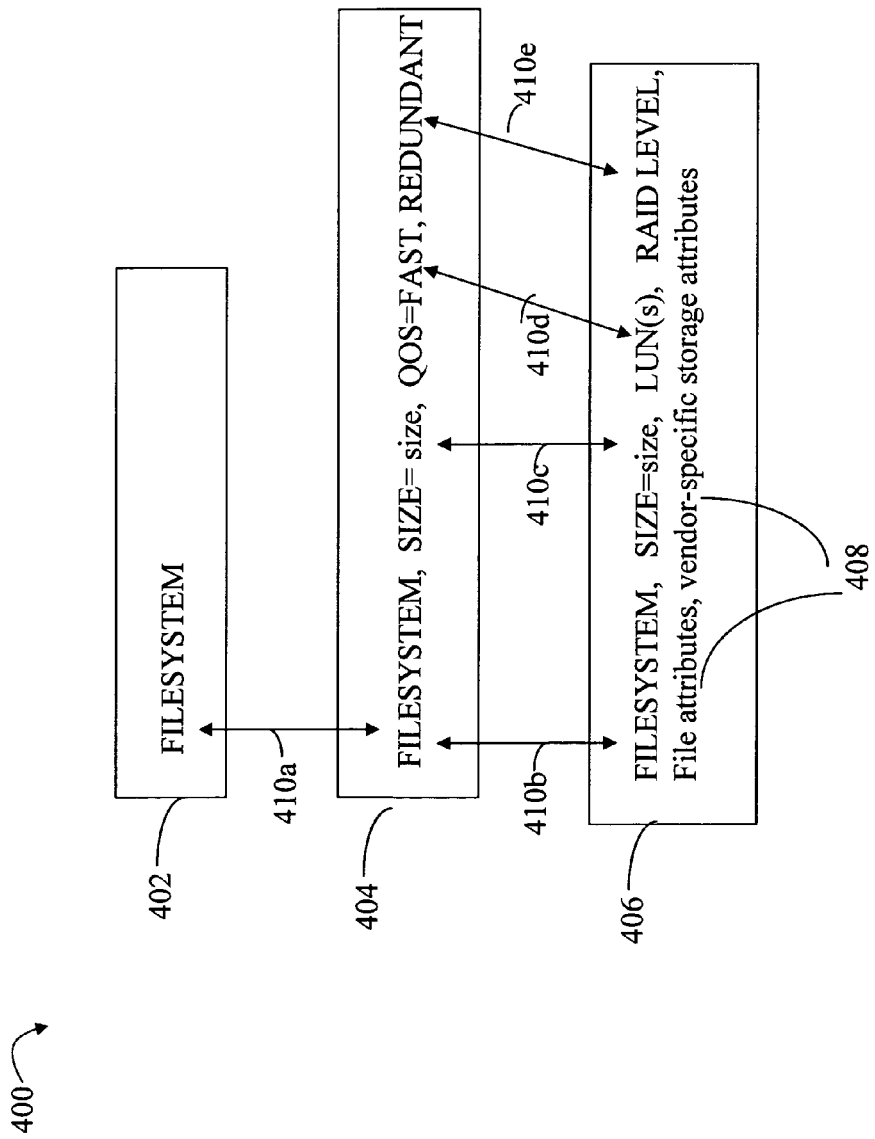

Referring to FIG. 5, shown is another representation of the mapping of the different parameters that may be performed by the rules of the different service providers. The example 400 further illustrates the parameter mapping between levels. Element 402 represents the data obtained by service provider 204*a*. Element 404 represents the data obtained by service provider 204*b* via direct user interaction or from provider 204*a*. Element 406 represents the data obtain by service provider 204*c* via direct user interaction or from provider 204*b*. The FILESYSTEM type is passed 410*a* as a parameter from level 1 to level 2, and then passed to level 3 410*b*. Level 1 mapping rules may define defaults based on best practices for the particular application as indicated by the parameters SIZE=size, specifying a default size for the file system, and QOS=FAST, REDUNDANT, specifying default quality of service (QOS) parameters for a fast device with redundancy. Level 2 mapping rules map the parameters of 404 to parameters of 406 as indicated by 410*c*, 410*d* and 410*e*. Additionally, level 2 mapping rules introduce additional default parameter values as indicated by element 408 when interacting with level 3.

As described herein, the user can connect and interact with the data storage system at various levels to perform different operations and tasks such as data configuration and provisioning requests and other data storage management tasks. The user, system administrator, and the like, may select the level of interaction that can vary with each request. The mapping rules provide for specifying any defaults that may be needed to implement the request. When implementing a same data configuration request for different applications, the defaults introduced at one or more levels may vary with application. The mapping rules at the different levels allow for implementation of best practices while insulating and abstracting the details from the user. For example, the rules used by the application service provider of FIG. 3 may be used to implement application specific best practices. The rule used by the intermediate storage service provider may be used to implement best practices with respect to the underlying data storage system. As such, using the techniques herein, a framework may be defined which provides customized interfaces for different user levels of interaction with respect to a particular application when performing a data service or other request in connection with data storage configuration and/or management for the particular application. Rules included in the framework may be selected for use depending on the application, data service, task or operation, and defined set of one or more user groupings. A user grouping may be defined as a set of one or more user levels and associated service providers. For example, FIG. 3 illustrates a single user grouping of 3 levels. A data service may be defined as a particular service performed in connection with a data storage configuration request.

In connection with the different one or more user groupings each corresponding to a different user level and associated service provider as described above, a different UI may be presented to the user. In particular with reference to FIG. 5 where there are 3 levels, a user interacting at level 1 may be a novice user and may be presented with a UI in which the user provides a name for the file system and no other parameters as indicated by 402. A user interacting at level 2 may be an intermediate user and may be presented with a UI in which the user provides parameters of a file system name, size, and attributes relates to QOS of fast and redundant of 404. A user interacting at level 3 may be an expert user and may be presented with a UI in which the user provides parameters of a file system name, size, LUNs, RAID level, and other file attributes and/or vendor-specific storage attributes of 406. The different UIs associated with a user grouping, for example, to perform a particular task or data service for an application, may be referred to as a UI set.

In connection with the customized UIs that can be provided to a user, the user may have a different level of expertise in connection with different applications, data services or tasks, and the like. Thus, it may be desirable to provide customized UI selection for each user and also provide a further granularity of UI customization for each user by allowing different UIs and levels of interaction for each user in accordance with each possible UI set or user grouping. For example, an embodiment may have a first UI set of 3 possible UIs and corresponding levels of interaction as described in connection with FIG. 2. The first UI set may be used in connection with performing data storage provisioning for an email application. Similarly, there may be a second UI set of 3 possible UIs and corresponding levels of interaction as described in connection with FIG. 2. The second UI set may be used in connection with performing data storage provisioning for an database application. A user may be a novice in connection with provisioning storage for use with the email application and the user may choose to interact with the system at the novice level 1 using the associated level 1 UI. That same user may also be an expert in connection with provisioning storage for use with the database application and the user may choose to interact with the system at the expert level 3 using the associated level 3 UI. What will be described in following paragraphs are techniques that may be used in connection with providing, for each user, customizable UI levels for different tasks, applications, and the like, as may be associated with different UI sets.

As described herein, a different UI set may be associated with each unique combination of application, data service or task, and the like. As such, a single user may have a different knowledge level and/or otherwise may have reason to vary a level of interaction when performing operations associated with each UI set. For example, a different UI set may be associated with each of the following: issuing requests in connection with provisioning or configuring storage for a particular email application, provisioning or configuring storage for a particular database application, monitoring a data storage system, migrating data, diagnosing system problems, adding or expanding data storage capacity such as adding a new device, destroying or removing data storage capacity such as when removing an existing device, providing data storage protection such as through redundancy, servicing the data storage system such as by applying software upgrades, patches, and the like. A single user may have a different level of expertise and interaction when performing requests associated with each of the foregoing UI sets. What will be described in following paragraphs are techniques that can be used to track and manage the different customized levels and associated UIs for each user.

Figure 6:
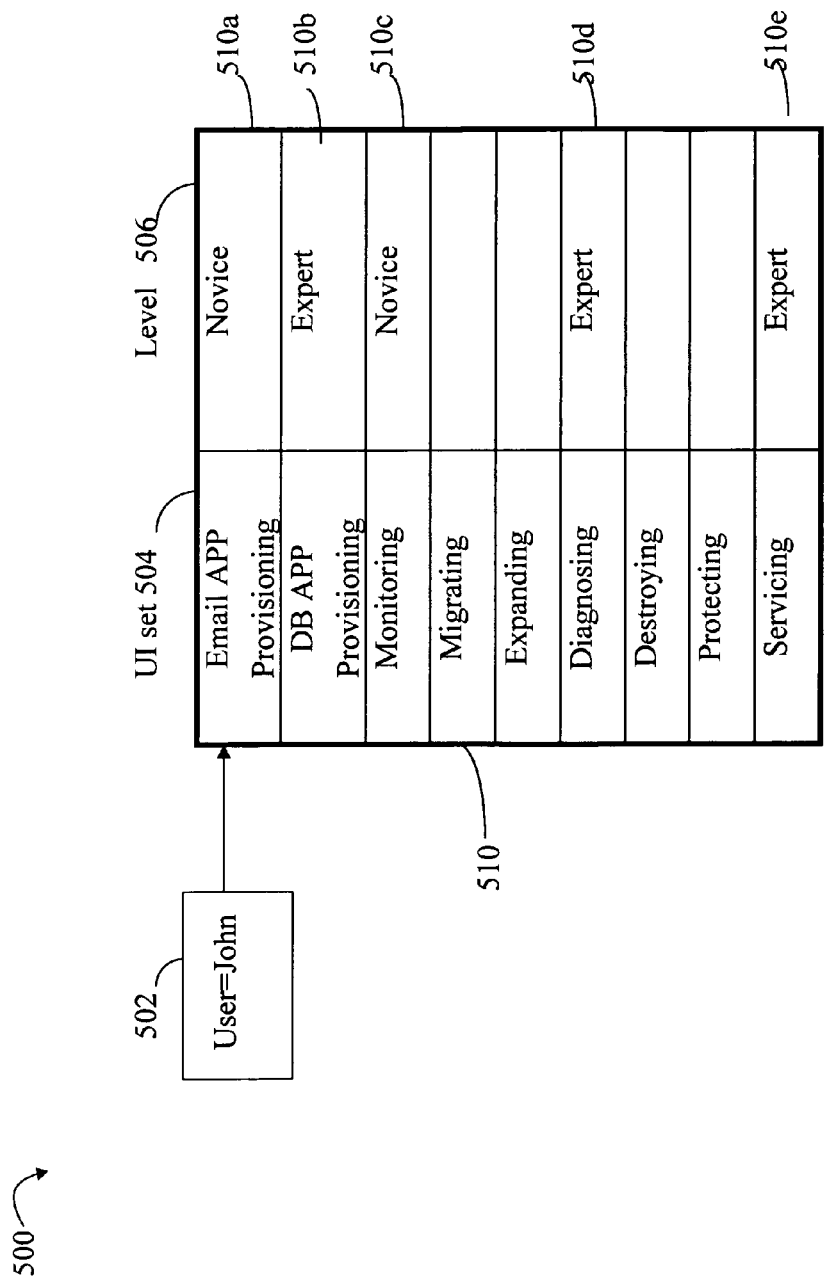
FIG. 6 is an example of user information that may be associated with each user in connection with each UI set in an embodiment using the techniques herein.

Referring to FIG. 6, shown is an example of information that may be associated and stored for a particular user in connection with the techniques herein. The example 500 illustrates user information 510 that may be maintained for a single user John 502. The information 510 is represented in tabular form for purposes of illustration only and can actually be stored in any organization, using any data structure, and in any data container, storage or repository known in the art. Information of 510 for each user may be stored, for example, in a data storage location including user information as represented by element 121 of FIG. 2 for use in connection with the techniques herein for providing different levels of customized UIs and user interactions. The table 510 may include a row for each possible UI set that may be available to a user. For each possible UI set, a corresponding UI level may be specified. Table 510 includes a column of UI sets 504 and corresponding levels in column 506. For an entry or row in the table 510, the level indicated in column 506 may specify a level of user interaction when performing operations and issuing requests for the application, task, and the like, associated with the UI set in column 504. With reference to the example 500, John is an expert (e.g., level 3) at performing tasks and issuing requests associated with UI sets for 510b, 510d, and 510e but is a novice (e.g., level 1) when performing tasks and issuing requests associated with UI sets for 510a and 510c. It should be noted that a blank entry may mean to use some system or other default level, or may otherwise indicate that user John is not allowed to view or perform operations using the UI set. Table 510 may be initialized, for example, by an administrator for user John as part of account management and/or creation.

Figure 7:
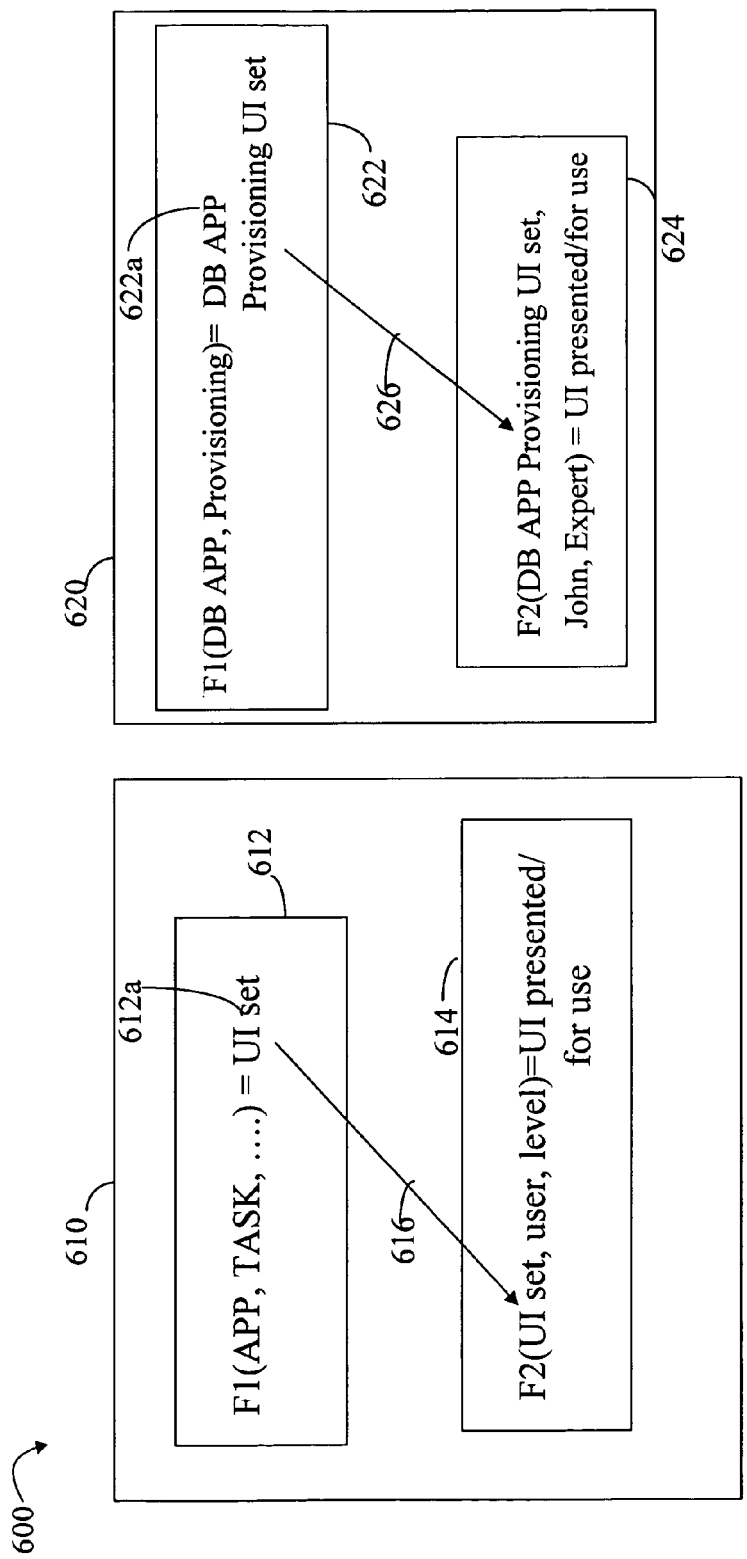
FIG. 7 is a representation of how a UI set may be selected and how a UI of a particular UI set may be selected in an embodiment using the techniques herein.

Referring to FIG. 7, shown is an example illustrating how each UI set may be specified and how a particular UI presented for a particular user may be selected. Element 610 is a general representation of the foregoing, and element 620 is an example of how a UI may be selected and presented in connection with user John having user information 510 as described in connection with FIG. 6. In other words, element 620 is a particular instance of the more general representation of element 610.

Element 612 represents how a UI set may be determined. Element 610 includes a function F1 which may have one or more input parameters such as APP (application), TASK (task or operation type), and the like. F1 may have one or more dimensions or parameters although two are illustrated herein. For each unique possible combination of input parameters, a different UI set or value for 612a may be determined. The UI set 612a may be an input to another function F2 represented by 614 to select a particular UI for use in connection with user interactions. F2 may have input parameters of UI set, user, and level used to select a UI presented/for use when interacting with a particular user. Element 620 includes elements 622 and 624. Element 622 illustrates that a UI set may be associated with a particular combination of APP (application) and TASK where the application is a database application (DB APP) and the task is to provision or configure storage (Provisioning) for the database application. Element 622a may be, for example, an identifier uniquely identifying the UI set (e.g., set of UIs for the different levels of interaction) of possible UIs for the particular input parameter values of F1 illustrated in 620. For example, the UI set identified by 622a may include 3 possible UIs for each of the 3 different levels illustrated in FIGS. 2 and 3. Element 624 may represent how one of the UIs of the UI set is selected for the particular user. In this example of 624, values from entry 510b of table 510 of FIG. 6 are used to select the UI of the UI set corresponding to the expert level ($3^{rd}$ parameter of F2) for user John (second parameter of F2).

Figure 8:
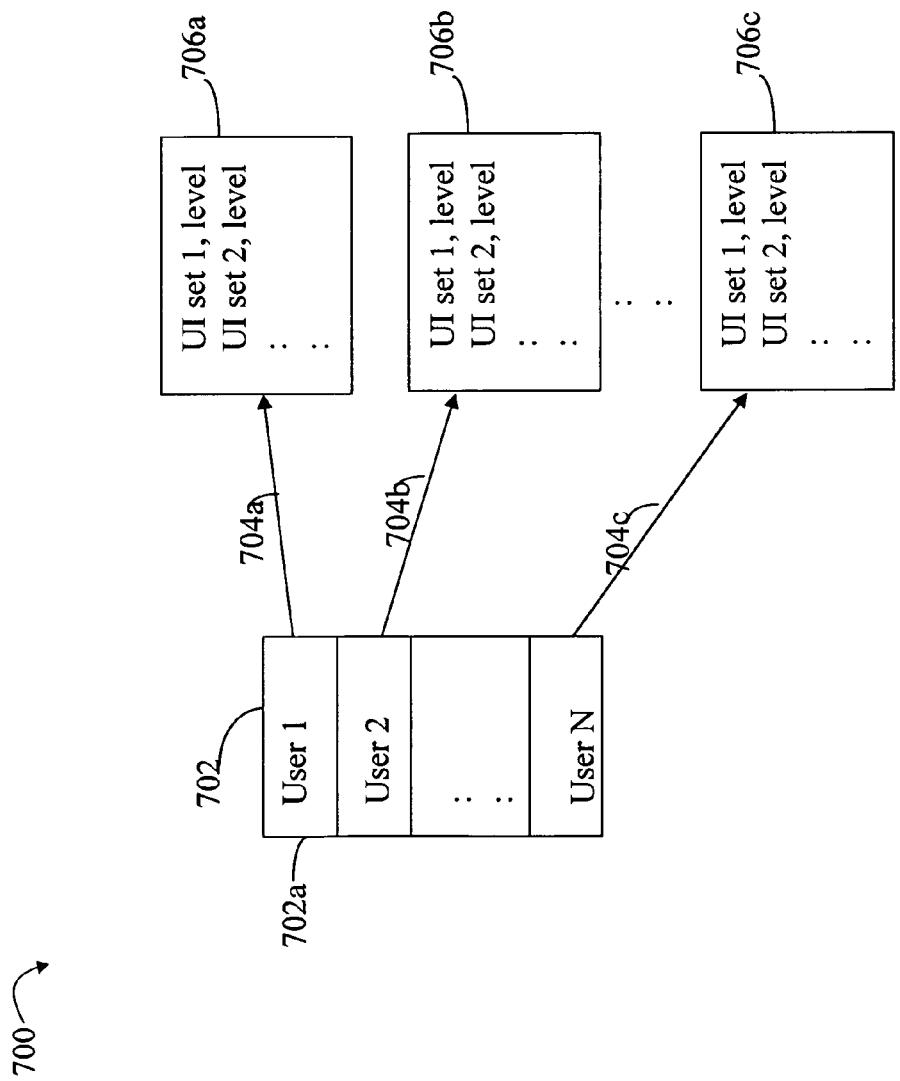
FIG. 8 is a representation of user information that may be stored for a plurality of users in an embodiment using the techniques herein.

Referring to FIG. 8, shown is an example representation 700 of multiple instances of user information that may be logically organized and stored for each user. The example 700 includes a table 702 of multiple users. Each user is indicated by a separate entry in the table 702. Associated with each user entry of table 702 is an instance of the user information as included in the table 510 of FIG. 6. The instances of user information are denoted as 706a-706c and are associated with a particular user as indicated by the corresponding arrows 704a-704c. Information of example 700 may be stored in the location represented by element 121 of FIG. 2.

Thus, the example 700 represents one way in which user information may be logically organized in connection with providing customized UIs for each user for the different UI sets and associated applications, tasks, and the like, that may be performed by each user.

An embodiment may also use other user information in connection with providing customized UIs for each user that will now be described.

Figure 9:
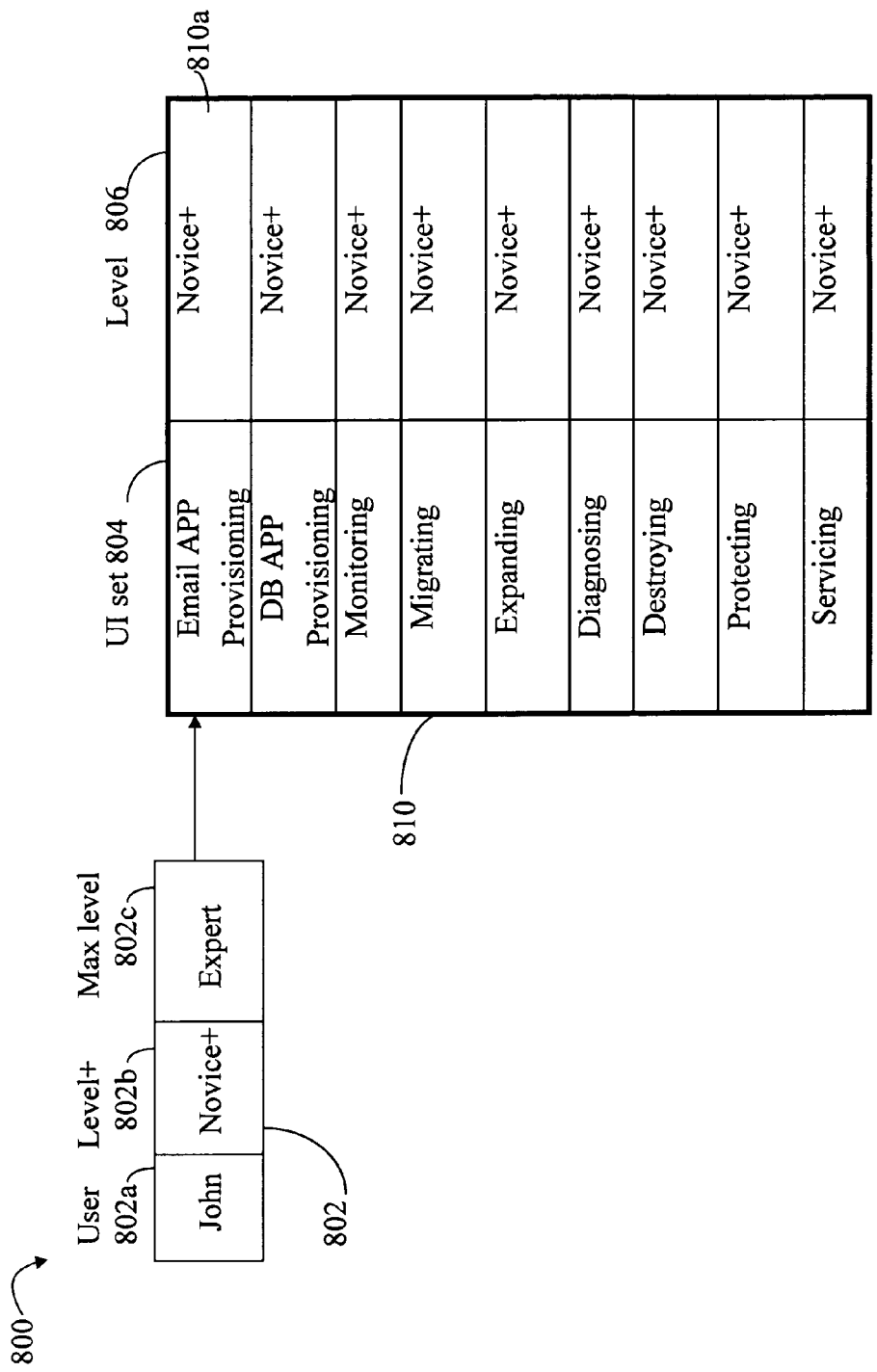
FIG. 9 an example of user information that may be associated with each user in connection with each UI set in another embodiment using the techniques herein.

Referring to FIG. 9, shown is an example of information that may be associated and stored for a particular user in connection with the techniques herein. The example 800 illustrates user information 810 that may be maintained for a single user John. An embodiment may use the information of FIG. 9 rather than the information described in connection with FIG. 6 for each user.

Element 802 may represent information that may be specified in connection with initializing the table of user information 810. Element 802 may include an identifier 802a specifying a particular user, a level indicator 802b, and a max (maximum) level 802c. Element 802b may identify a particular level of interaction, such as novice (level1) or expert (level 3). Element 802b may also optionally include a UI extension indicator, such as a "+" sign. The extension indicator indicates that the specified level is a starting level and that the user 802a may be allowed to use the UI at levels higher than that as indicated in 802b. The level indicated in 802b in this example is Novice and may specify a starting or default level which is used in initial presentation and interactions with John during a session. A session may be defined, for example, as a set of interactions associated with a user when logged on to the system. The session may terminate when the user logs off or the session may be otherwise terminated. Although a "+" is used herein for purposes of illustration, other elements, characters, and the like, may be used to represent when a UI extension indicator is specified. Element 802c specifies an optional maximum UI level. Element 802c may be characterized as a "cap" or maximum UI level that may be presented and accessible to the user John. To further illustrate, if the UI extension indicator "+" is omitted, John may only have access to UI level Novice. When the "+" is specified, the UI displayed initially may be associated with the Novice level, and John may be able to utilize UIs associated with one or more levels higher than Novice (e.g., UIs associated with levels indicating more experienced user levels than Novice). Max level 802c indicates that John may be allowed to display and interact at any level between novice, as indicated in 802b, up to and including expert, as indicated by 802c.

Element 810 represents a table of user information indicating a UI set 804 and corresponding level 806 similar to that as described in connection with table 510 of FIG. 6. In this example 800, however, the level 806 may specify one of the possible levels of interaction associated with a UI set of 804 and may also optionally include the UI extension indicator, "+".

An administrator may, for example, specify the data of 802 which may then be used to initialize or populate the table 810 of FIG. 9 for a particular user. After initialization, the table 810 may then be optionally modified or further customized for the user John via manual and/or automated techniques. Examples of automated customization are described in more detail in following paragraphs. The user information 810 may be customized, for example, by changing a level of 806 and/or adding/removing the UI extension indicator, "+", for an entry in 810.

The data of 802 may be specified when first creating the table 810 for a user. The data of 802 may also be optionally stored for further use, for example, if additional UI sets are added for use with the techniques herein.

As a variation to the foregoing, each entry in the 810 may include a max level rather than have a single max level associated with a user as indicated by 802.

Figure 10:
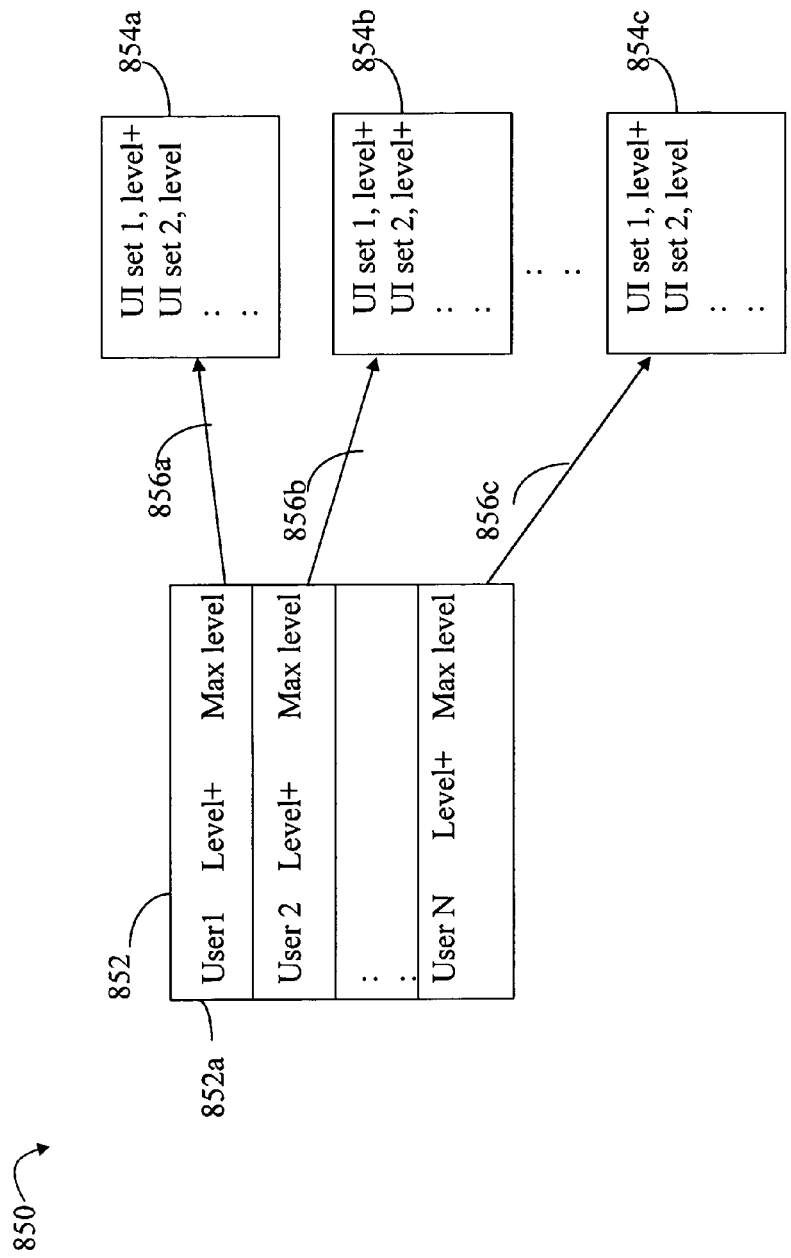
FIG. 10 is a representation of user information that may be stored for a plurality of users in another embodiment using the techniques herein.

Referring to FIG. 10, shown is an example representation 850 of multiple instances of user information that may be logically organized and stored for each user. The example 850 includes a table 852 of multiple users. Each user is indicated by a separate entry in the table 852. Associated with each user entry of table 852 is an instance of the user information as included in the table 810 of FIG. 9. The instances of user information are denoted as 854a-854c and are associated with a particular user as indicated by the arrows 856a-856c. Information of example 850 may be stored in the location represented by element 121 of FIG. 2.

Thus, the example 850 represents another way in which user information may be logically organized in connection with providing customized UIs for each user for the different tasks that may be performed by each user.

In connection with the foregoing description, the UI extension indicator (e.g., "+") may provide for dynamic extension of the UI for the associated user. In contrast, omitting the UI extension indicator may provide for static UI specification for a particular user. When the UI extension indicator is specified in an entry of a user information table, the default or starting UI level may be adjusted manually and/or automatically using other techniques described in more detail below.

What will now be presented is a more detailed example with associated UIs that may be displayed in connection with user John having a table of user information as described in table 810 of FIG. 9. With reference back to FIG. 9, John may be interacting with the data storage system to perform provisioning and data storage configuration for an email application so that entry 810a of table 810 is used to determine the appropriate UI displayed and level of user interaction. As indicated by 810a, John has a starting or default level of Novice and the UI display may be initialized accordingly.

Figure 11:
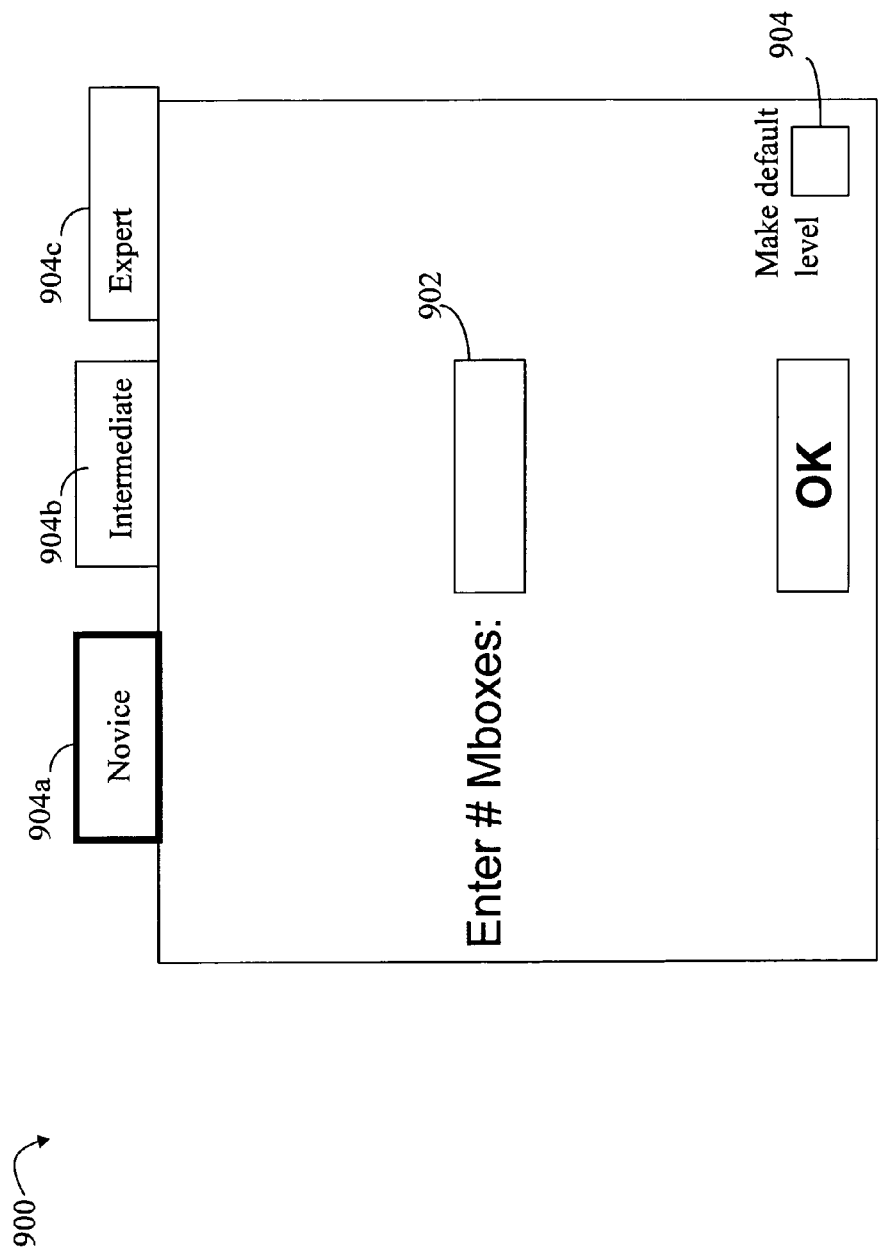
FIGS. 11, 12, and 16-18 are examples of UIs that may be displayed in an embodiment using the techniques herein.

Referring to FIG. 11, shown is an example of a UI that may be displayed in connection with a session for user John based on entry 810a of FIG. 9. The current default or starting level of novice is indicated by the highlighted novice tab 904a. Since the UI extension indicator+is specified in 810a indicating additional levels of allowable or possible UI exposure, additional tabs associated with higher levels intermediate 904b and expert 904c are also displayed. Since the max level for user John as indicated by 802c of FIG. 9 is expert, both tabs 904b and 904c are displayed and may be selected by user John. As a further illustration, if instead, the max level of 802c for John was intermediate, an embodiment may choose to omit displaying and/or otherwise making available for selection, the expert tab 904c. An embodiment may also have the expert tab 904c included in the display based on previous user interactions with John, for example, indicating that John has knowledge and is capable of performing operations at the intermediate level. In connection with the novice or level 1 UI, only a single parameter 902 may be specified. John may enter a value for 902 indicating a number of mailboxes (Mboxes) for which storage will be provisioned. After entering the value in 902, John may select OK in order to implement the desired provisioning.

The example 900 also includes an option 904 which provides for making the currently active UI level as indicated by the bolded tab 904a the default or starting level of interaction. Thus, a user may select to manually change the starting level of UI interaction for the UI set by selecting 904. For example, selection of 904 for user John would cause entry 810a of table 810 to be updated so that column 806 may indicate Novice as the starting or default level if it not already so specified.

Although the display of the example 900 may be initially presented to John, John may also select to not interact at level 1, Novice and may select another one of the tabs 904b or 904c to perform a provisioning request for additional mailboxes. John may select tab 904b intermediate causing an update to the UI display as indicated by FIG. 12.

Figure 12:
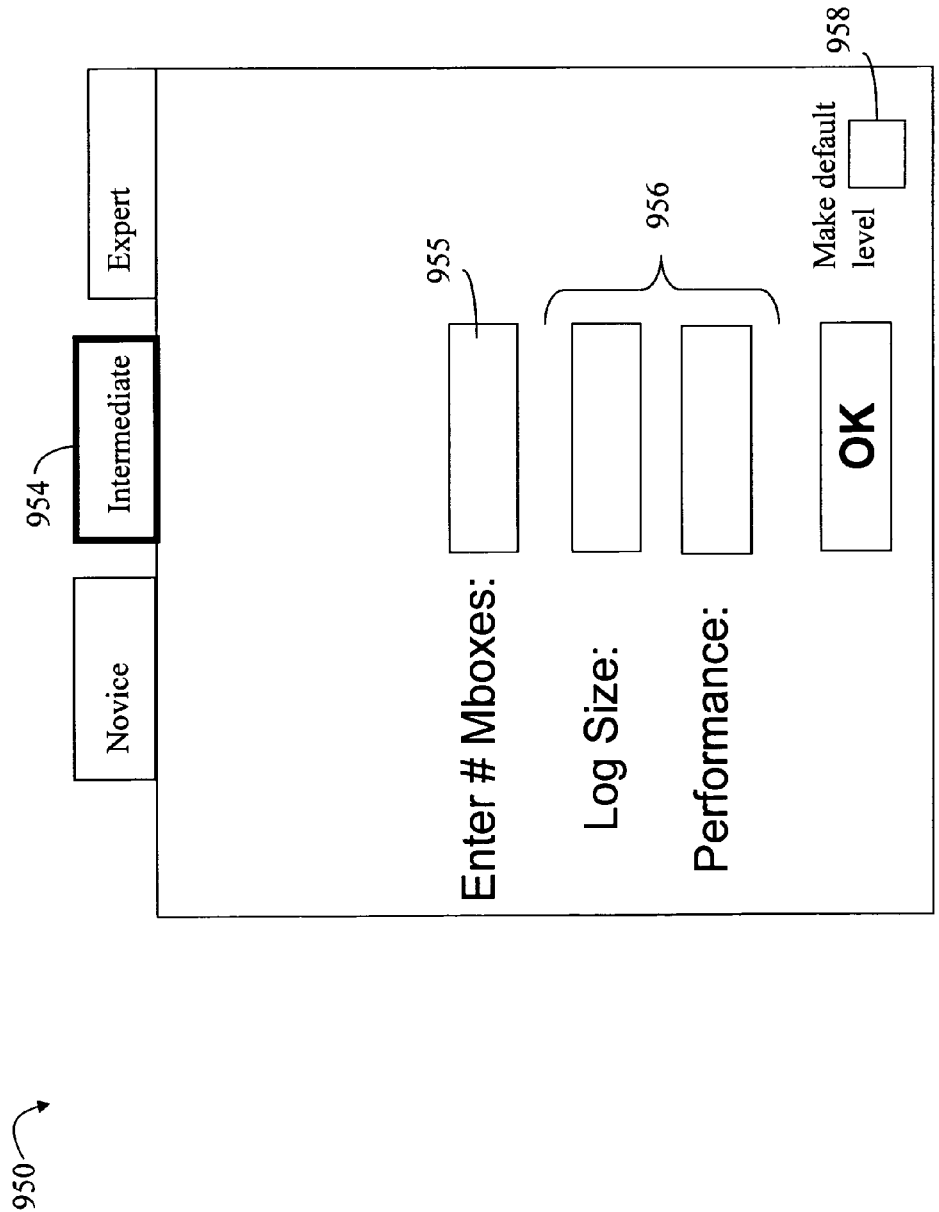

Referring to FIG. 12, shown is an example of a UI that may be displayed in response to John selecting the intermediate tab. The currently active tab is indicated by the bolded tab 954. The UI may be updated to display additional fields 956 associated with the intermediate level. A novice user may not have the knowledge about log files or performance parameters that may be associated and specified in connection with provisioning storage for use with the email application. Thus, a novice user may opt to provision storage by specifying only the information for the parameter 902 of FIG. 11. In accordance with techniques described herein, other code included in the data storage system may be used to determine in accordance with best practices the other appropriate parameters for provisioning storage for the request. John, however, has chosen to interact with the system to perform the provisioning request at the intermediate level. The example 950 displays information with the intermediate level of interaction and associated knowledge level. The intermediate level may, for example, assume that the user has additional knowledge beyond the novice and specifies the additional information of 956. In accordance with techniques described herein, other code included in the data storage system may be used to determine in accordance with best practices the other appropriate parameters for provisioning storage for the request based on the inputs provided by John for 955 and 956. Once John inputs values for 955 and 956, John selects OK and storage may be accordingly provisioned for the email application storage request. As described above, John may also select 958 to make the intermediate level his starting or default UI level when performing email application provisioning requests.

An embodiment may also not allow John to select and update the starting UI level to intermediate by selection of 958 until John has successfully completed a threshold number of one or more provisioning requests from the intermediate level.

As a variation to the foregoing example, John may interact with the system at the novice level using the UI of FIG. 11. After John inputs a value, such as 100, for the parameter 902 in connection with interacting at the novice level as indicated in FIG. 11, John may choose to not yet implement the request by selecting OK. Rather, John may select the intermediate tab after entering a value in 902 of FIG. 11 resulting in the display of FIG. 12 which is populated with the value as entered by John in 955, and additional data values in 956 automatically determined by the data storage system. The display of FIG. 12 may include in portion 956 corresponding data values determined in accordance with best practices by other code on the data storage system for the requested 100 mailboxes. In other words, John may perform the foregoing to gain knowledge and insight into how to provision storage for mailboxes for the email application by viewing what the code on the data storage system determines as data values of 956 in response to his entry of 100 mailboxes.

As mentioned above, the default or starting UI level for a particular UI set may be updated automatically as well as manually (e.g., such as via user selection of 958 of FIG. 12). An embodiment may collect information in connection with a particular user's interactions and activities and update the user's default or starting level for a UI set. For example, information regarding John's selections of the novice, intermediate and/or advanced tabs of FIG. 12 may be collected. In response, an embodiment may automatically update the starting UI level for that particular UI set. The automatic updating of the starting UI level for a UI set may be determined in accordance with one or more criteria such as, for example, John's manual selection to interact at a particular level, the number of successful provisioning requests John performs at a level, and the like. For example, code may be executed to monitor the current UI level when John performs a provisioning request and when John has specified values for the parameters presented at a particular UI level. The code may also monitor whether the foregoing provisioning request was successful or otherwise results in an error. If the request is successful, the starting UI level for that UI set may be accordingly updated to the current UI level associated with John's successful provisioning request (e.g., entry column 806 of 810 may be accordingly updated). If the request results in error or failure, then the starting UI level may not be updated (e.g., entry column 806 of 810 will not be updated).

Figure 13:
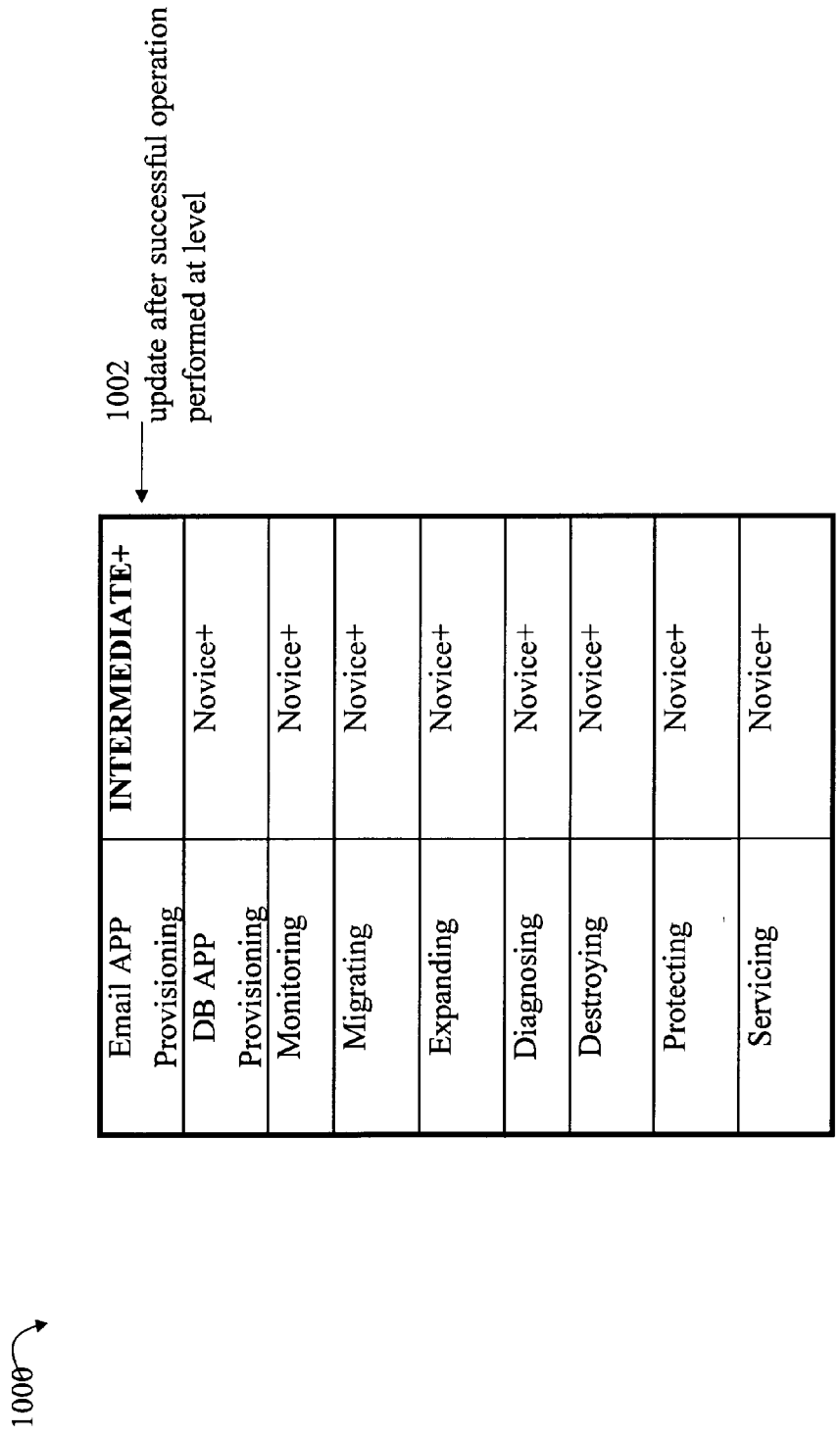
FIG. 13 is an example illustrating updating of user information in accordance with manual and/or automatic techniques that may be performed in an embodiment.

Referring to FIG. 13, shown is an example 1000 of the user information table for user John which has been automatically updated in accordance with the techniques herein. Entry 1002 may be updated, for example, if John enters values for parameters at the intermediate level and after John's provisioning request made at the intermediate level has been deemed to successfully provision the requested storage for the email application. As described above, code may perform the update in response to detecting that one or more criteria have been met, events have occurred, and the like, that may be related to John's activity and interactions in connection with the associated UI set (e.g., John's activity and interactions as related to the email application and the task of provisioning storage for the email application).

Thus, use of the UI extension indicator "+" for a particular UI set may provide for dynamic adjustment of a starting UI level for a user in accordance with manual and/or automatic techniques as may be included in an embodiment.

The user information of table 510 of FIG. 6 and user information of table 810 of FIG. 9 may be used alone, or in combination with additional user information specifying user roles and/or permissions. In other words tables 510 and 810 may be used to indicate a first set of user information specifying UI levels and levels of user interaction for different UI sets. However, the foregoing first set of user information may be used in combination with a second set of user information specifying roles and/or permissions. This second set of information may be used to indicate which of the specified UI levels and levels of user interactions of the first set are allowable or possible.

Figure 14:
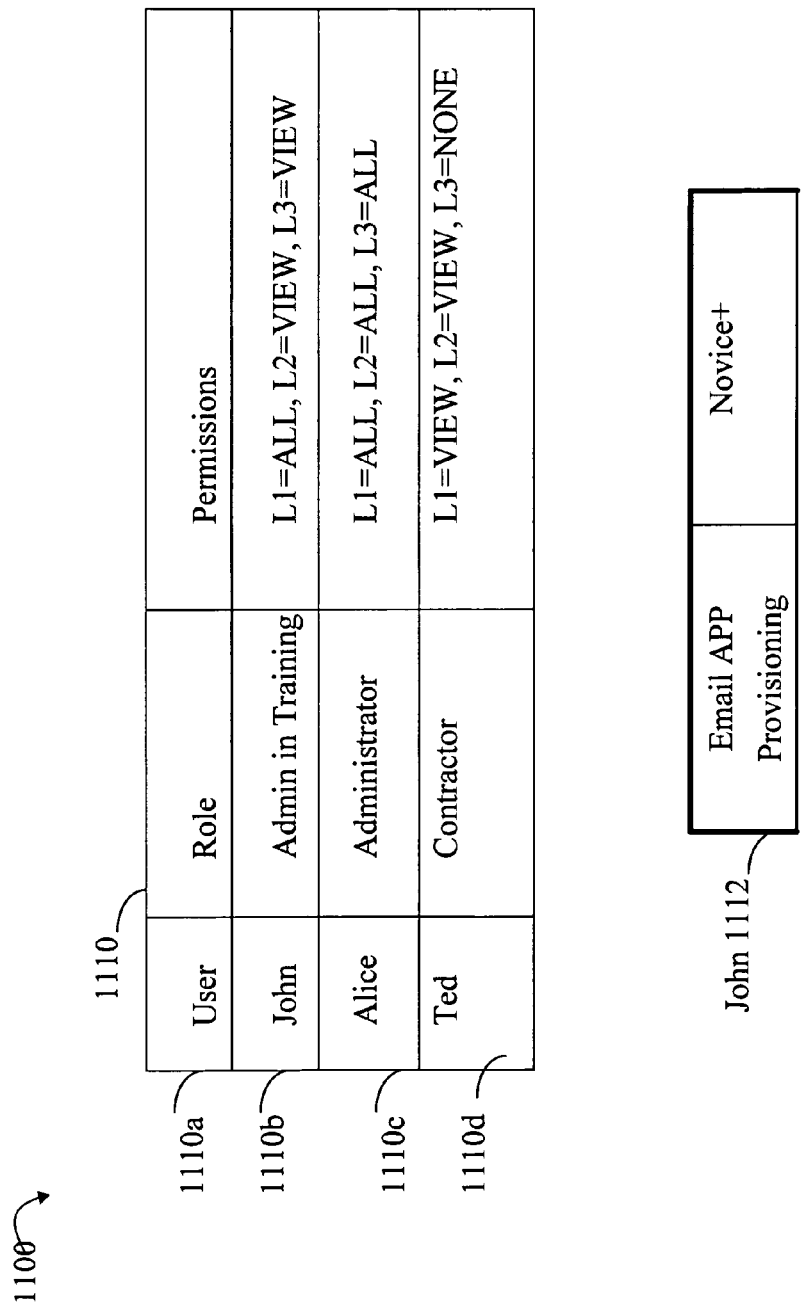
FIG. 14 is an example illustrating use of roles and permissions in an embodiment using the techniques herein.

Referring to FIG. 14, shown is an example 1100 illustrating how a first set of user information indicating UI levels and levels of user interaction may be used in combination with roles and permissions. The example 1100 includes element 1112 which represents entry 810a of table 810 from FIG. 9 for user John. Table 1110 includes different roles and permissions that may be specified for different users. Table 1110 includes a row or entry for each user. Element 1110a indicates that user John has a role of administrator in training and permissions indicated as follows: L1=ALL, L2=VIEW, L3=VIEW. For purposes of illustration, Ln refers to a particular level number of user interaction and UI level n. Also in this example, novice corresponds to L1, intermediate to L2, and expert to L3. John is allowed to perform all requests from L1 and only allowed to VIEW results from L2 and L3. In other words, John is not allowed to enter any input parameters at L2 and L3, and is not allowed to implement a provisioning request from L2 and L3. John is only allowed to implement a provisioning request and modify parameters at L1. John may input information associated with a request at L1, and then view the additional parameters associated with L2 and L3 as may be automatically determined by code in accordance with best practices. As such, John may learn or gain knowledge, for example, by viewing the parameter values determined for L2 and L3 by the code implementing the best practices for the different requests. Entry 1110b indicates that user Alice is an administrator and is able to implement requests from all level L1, L2 and L3. Entry 1110c indicates that user Ted is a contractor and is only able to view information at L1 and L2. Ted is not allowed to implement or issue any requests from any level.

It should be noted that although the table 1110 specifies a set of permissions that apply to all UI sets, an embodiment may also specify a set of permissions for each UI set, or one or more UI sets.

In an embodiment using roles and permissions of table 1110 in combination with other user information for user John as indicated by 1112, John is able to view but not modify or otherwise issue provisioning requests from any UI level other than L1, novice. Thus, the information of table 1110 may be used to indicate those requests which are allowable for a particular user.

Described above are some ways in which an embodiment may choose to automatically update a default or starting UI level for a UI set. Such an update may automatically be performed by code that monitors user activity, collects data related to the user activity and performs analysis of the collected data. The foregoing update may be based on, for example, successful completion of a threshold number of requests issued from a particular level, a number of successive user selections, or some combination of the foregoing as well as other criteria that may be specified in an embodiment.

Figure 15:
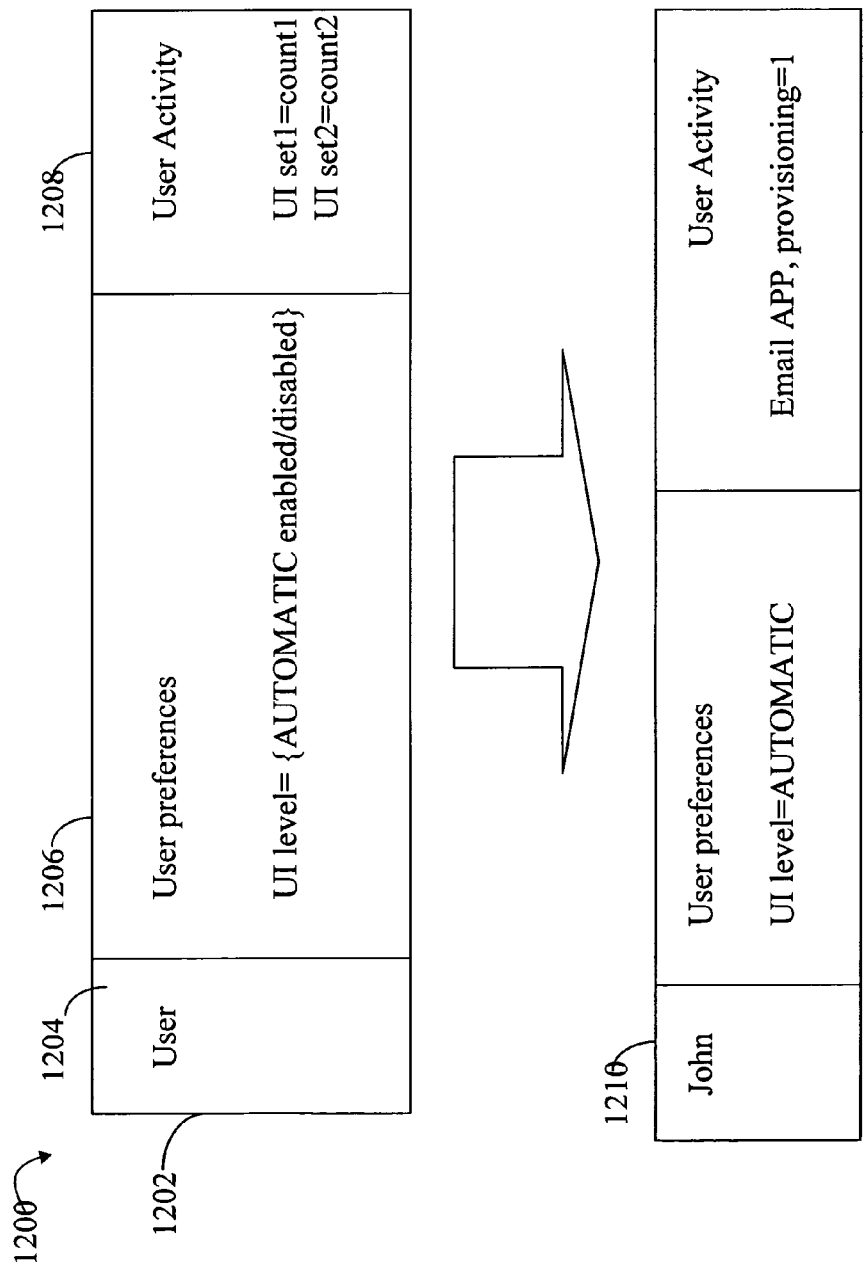
FIG. 15 is an example of user preferences and user activity information that may be used in an embodiment in connection with the techniques herein.

Referring to FIG. 15, shown is an example representation of user preferences and collected information that may be used in automatically adjusting the starting or default UI level for one or more UI sets. The example 1200 includes a table 1202 of information that may be stored for each user indicated by 1204. For each user, user preferences 1206 and user activity information 1208 may be specified. The user preferences 1206 may include preferences specified by the user. In connection with the techniques herein, a user may indicate whether the automatic adjustment of starting or default UI level is enabled/disabled. User activity information 1208 may include one or more counters represented information collected in accordance with observed user activity. Information of 1208 may be further analyzed in connection with determining whether to automatically adjust a starting or default UI level. Information of 1208 may be used if the UI level of 1206 indicates that the foregoing automatic adjustment of starting UI level is enabled. In this example of 1206, there is a single or global indicator which may enable/disable the foregoing automatic adjustment of starting UI level for all UI sets. However, an embodiment may provide for a finer granularity of control by allowing enablement/disablement specification for an individual UI set or groups of UI sets. The particular information collected in 1208 may vary with the criteria used to determine whether to automatically adjust a starting UI level for one or more UI sets. For example, an embodiment may adjust the starting UI level for a UI set depending on whether a threshold number of successful requests have been performed by the user. The criteria for updating the starting UI level may also include that the foregoing requests be made in one or more sessions, within a given time period, and the like. Such information may be collected in 1208 as illustrated. At the start of each user session, information of 1208 may be reinitialized. Other embodiments may use other techniques for data collection and analysis across multiple user sessions.

The information of FIG. 15 may also be stored in a variety of different locations. In one embodiment, the information associated with each user as represented in FIG. 15 may stored in the location associated with element 121 of FIG. 2.

Figure 16:
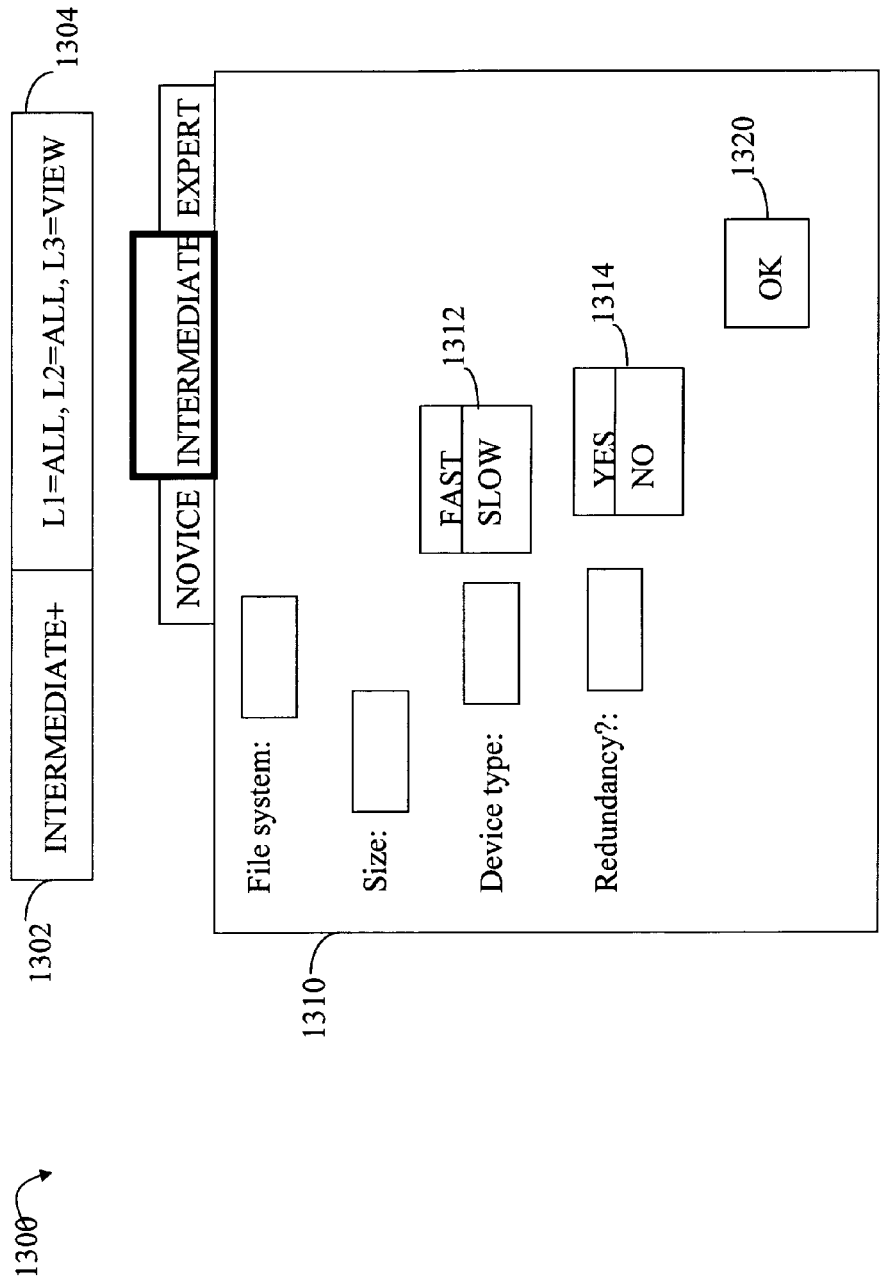
Figure 17:
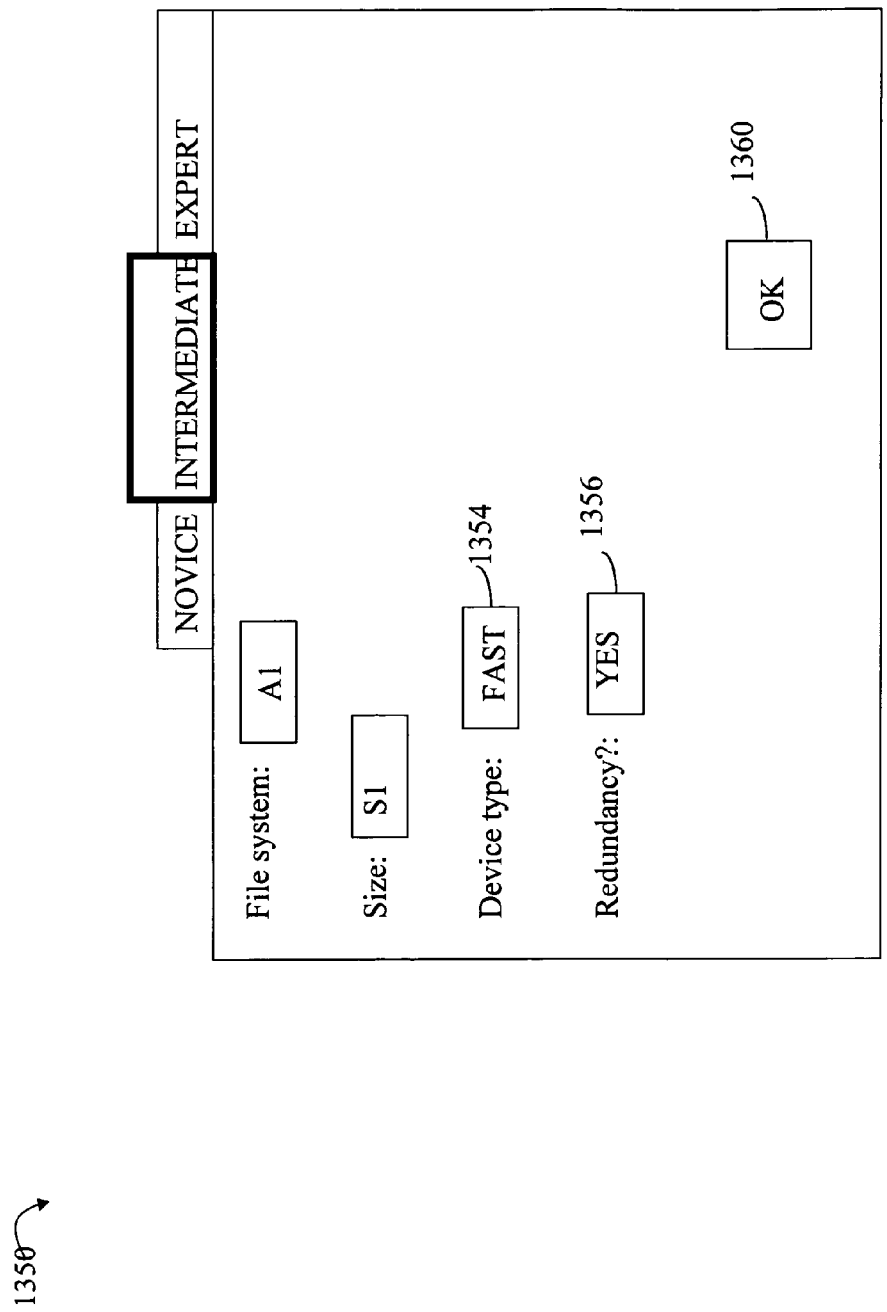
Figure 18:
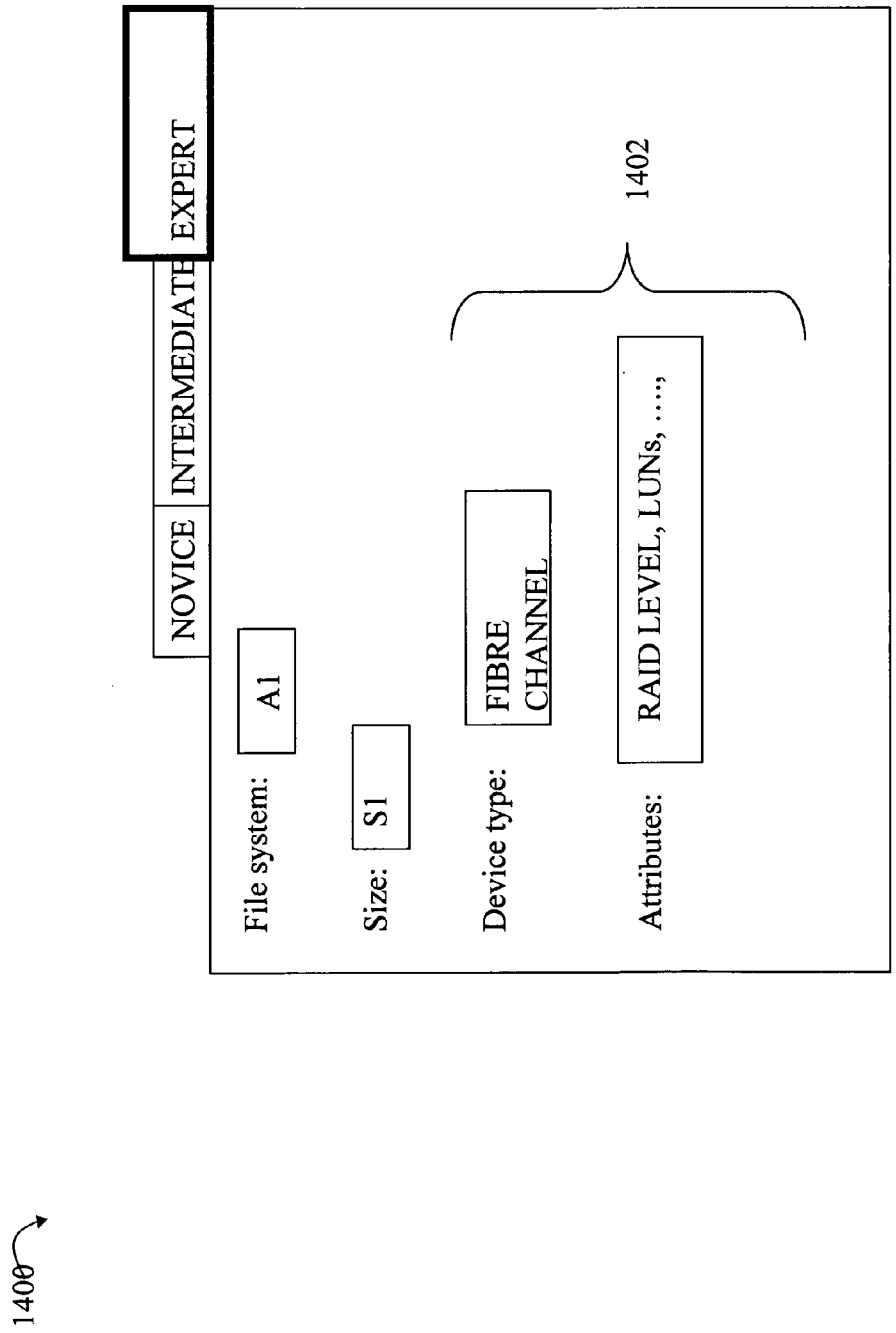

What will now be described in connection with FIGS. 16, 17 and 18 is another example illustrating UIs that may be displayed and used in accordance with the techniques herein described above. Following figures and description make reference to a UI set including 3 UI levels in accordance with FIG. 5. The UI set may include 3 levels: a novice level 1 associated with 402 of FIG. 5, an intermediate level 2 associated with 404 of FIG. 5, and an expert level 3 associated with 406 of FIG. 5.

Referring to FIG. 16, shown is an example of a UI that may be displayed in an embodiment in accordance with the techniques herein. Element 1302 represents information that may be included in an instance of a table of user information 810 of FIG. 9 specifying a starting level of intermediate and a UI extension indicator "+" for the above UI set when issuing a request to provision storage for a file system. Element 1304 may represent permissions allowed for a user. Element 1310 may represent a UI initially displayed for the intermediate level corresponding to element 404 of FIG. 5. Element 1312 may represent a menu that can be displayed by a user in making a selection for device type. Element 1314 may represent a menu that can be displayed by a user in making a selection for redundancy. Selection of the OK button 1320 may result in issuance and implementation of the request in accordance with the information on the display. However, in connection with this example, the user does not select 1320 at this time but rather inputs the requested parameters for file system, size, device type and redundancy.

FIG. 17 may represent the display of FIG. 16 updated with a user's selections and parameter inputs. Subsequently, the user may select the expert tab to view the corresponding data associated with the expert level as may be automatically determined in accordance with best practices. FIG. 18 illustrates the resulting UI display upon selection of the expert tab from FIG. 17. The value of FAST specified in 1354 of FIG. 17 and the input of REDUNDANT=YES (1356 of FIG. 17) are mapped, respectively, in accordance with best practices to the information of 1402. Specification of FAST at the intermediate level illustrated in FIG. 17 causes the system to automatically provision storage from LUNs of one or more Fibre channel devices as indicated by 1402. Specification of REDUNDANT=YES at the intermediate level illustrated in FIG. 17 causes the system to automatically provision storage with some RAID level providing redundancy as indicated in the attributes of 1402.

It should be noted that FIGS. 16 and 17 each include an OK button which the user may select to issue and implement the request. This is in accordance with the permissions of 1304 of FIG. 16. FIG. 18 does not include an OK button in this example since for this particular user, the user is only allowed to view information at the expert level 3. Furthermore, the user may not be able to modify any values displayed in FIG. 18. The information of the UI of FIG. 18 may be read-only in this example. If Element 1304 of FIG. 16 is modified to indicate "L3=ALL", then the display of FIG. 18 may also include an OK button that may be selected to implement the request and the information of the UI of FIG. 18 may also be accordingly modifiable by the user.

In connection with the UI extension indicator as described herein, the examples have illustrated the user selecting to interact at higher levels of expertise or knowledge than the starting level. However, it should be noted that specifying a UI extension indicator may also allow a user to interact at levels characterized as lower than (e.g., associated with levels of greater abstraction) than the starting level as well. For example, referring back to FIGS. 16-18, a starting level of intermediate with the extension indicator "+" in 1302 also allows a user to selectively interact at the novice level as well as the expert level. Specifying a starting level alone without the extension indicator may indicate that the user is only allowed to interact at the starting level. Alternatively, an embodiment may also be implemented so that specifying the starting level without the extension indicator means that the user is allowed to interact at the starting level or other levels of greater abstraction, requiring less knowledge, and the like.

One use of the techniques herein provides for specifying a starting or default UI level for each UI set for a user. The starting UI level may be customized for each UI set for each user. The techniques herein also provide for adjusting or updating the starting UI level for a particular UI set, for example, as a user's proficiency increases. Automatic adjustment to the starting UI level may be performed automatically in accordance with criteria. Processing may be performed to automatically adjust a starting UI level for a UI set in accordance with criteria associated with the particular UI set. The foregoing criteria may be associated with performing operations, selections, tasks, and the like, possibly in connection with a particular application, as may be associated with the UI set.

The foregoing provides examples of how a UI (e.g., including its content, menu, menu options and the like) may be customized for each user based on user-specific information such as, for example, user level or expertise, role, application, and operation or task. The UI may be the interface presented using a gadget of a user device such as illustrated in FIGS. 1A and 1B. Information for each such user may be stored in a data container (e.g., database, file or any other suitable repository for storing data), such as represented by element 121 of FIGS. 1A and 1B. Additionally, the UI may also be customized for the particular device and integrated UI framework. For example, the form of a menu, menu item, information display, and the like, may vary with the device and/or framework such as may be due to size of a device display and look and feel of GUI aspects (e.g., buttons, menus) for the particular framework.

Figure 19:
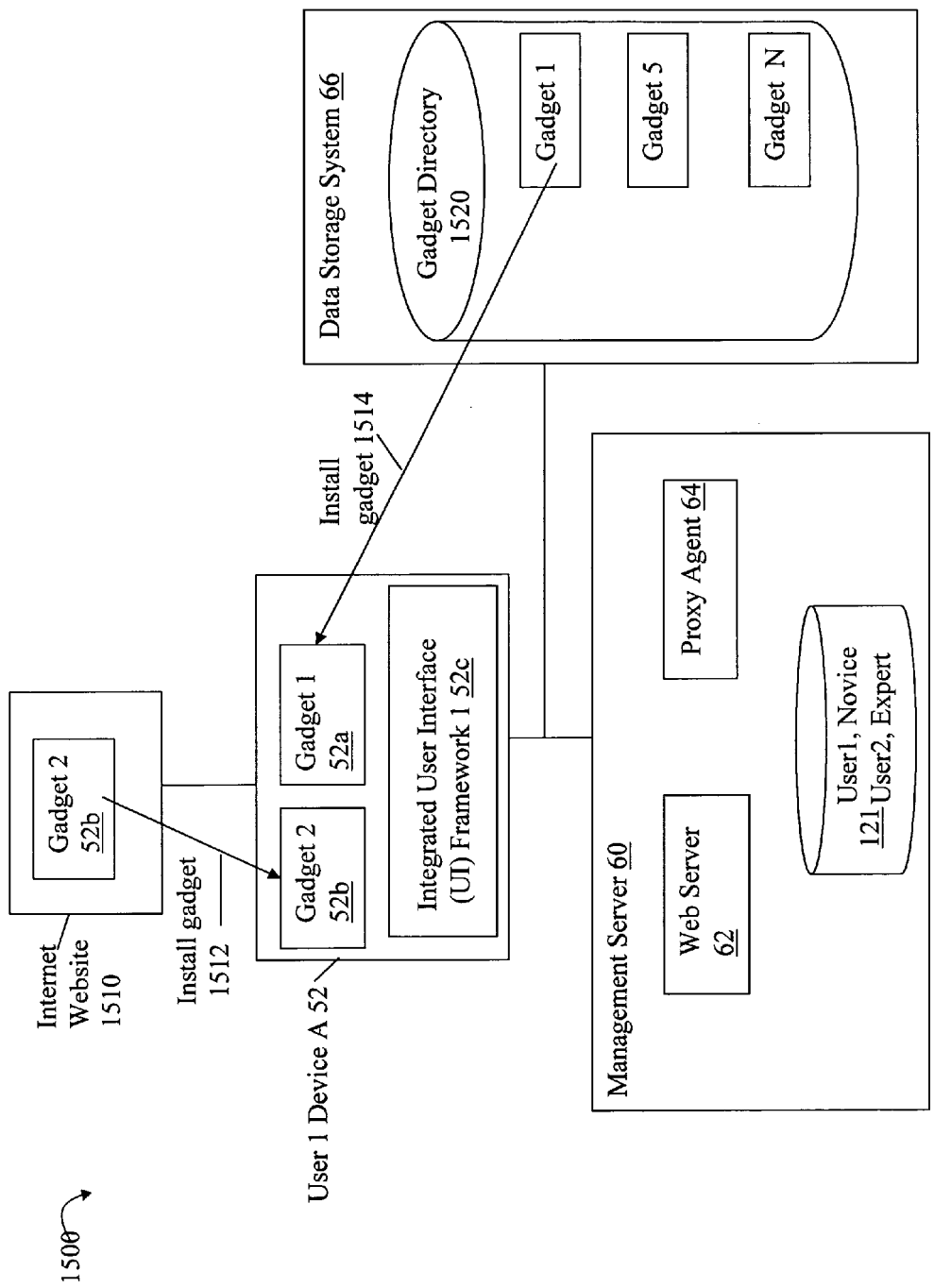
FIGS. 19, 20 and 21 are examples illustrating gadget installation and UIs displayed in an embodiment in accordance with techniques herein.

Referring to FIG. 19, shown is an example illustrating installation of gadgets in a framework in accordance with techniques herein. The example 1500 includes a device 52 having integrated UI framework 52c for user 1. User 1 may install gadget 1 52a in accordance with the particular the particular framework 52c. Gadgets may be obtained from any one or more locations. As a first example, the data storage system 66 may include a gadget directory, 1520 of one or more gadgets which may be selected for installation on user device 52. Gadgets of 1520 may be included by a vendor or supplier of the data storage system 66. In this first example, gadget 52a may be installed 1514 from a gadget directory 1520 included in one of the data storage systems being managed, system 66. As a second example, gadgets may be obtained via internet download. In the example 1500, the gadget 52b may be downloaded from the internet website 1510 and installed 1512 on the device 52.

Subsequent to gadget installation, the components of 1500 are configured with the addresses of the data storage system(s) being managed. As an example, the proxy agent 64 is provided with the addresses (e.g., IP addresses) of the data storage systems being managed in order to communicate with the systems. In the case where the gadget is installed from one of the data storage systems 66 being managed, the address the system 66 may be automatically provided to the proxy agent 64 during the gadget 52a installation process. Alternatively, an address for each of the data storage systems managed may be provided manually such as part of a manual configuration process performed by a user entering the appropriate IP addresses. Each user performing data storage system management may have an account created. As part of account creation, a user identifier, level of expertise, role, permissible devices, password and possibly other information may be specified. During operation, the user may login to the management server 60 from device 52 and present appropriate user identifier and password information to the web server 62. The web server 62 may perform authentication processing to ensure that the user identifier and password are valid prior to performing any processing for data storage management such as when communicating with gadgets 52a and 52b. Once a user has successfully logged in, the UI as facilitated with gadgets 52a and 52b may be populated or initialized with information for display on device 52 within the framework 52c.

In a manner as described above with device 52, user 1, as well as other users, may also install gadgets on any other device which may be used for data storage management.

Figure 20:
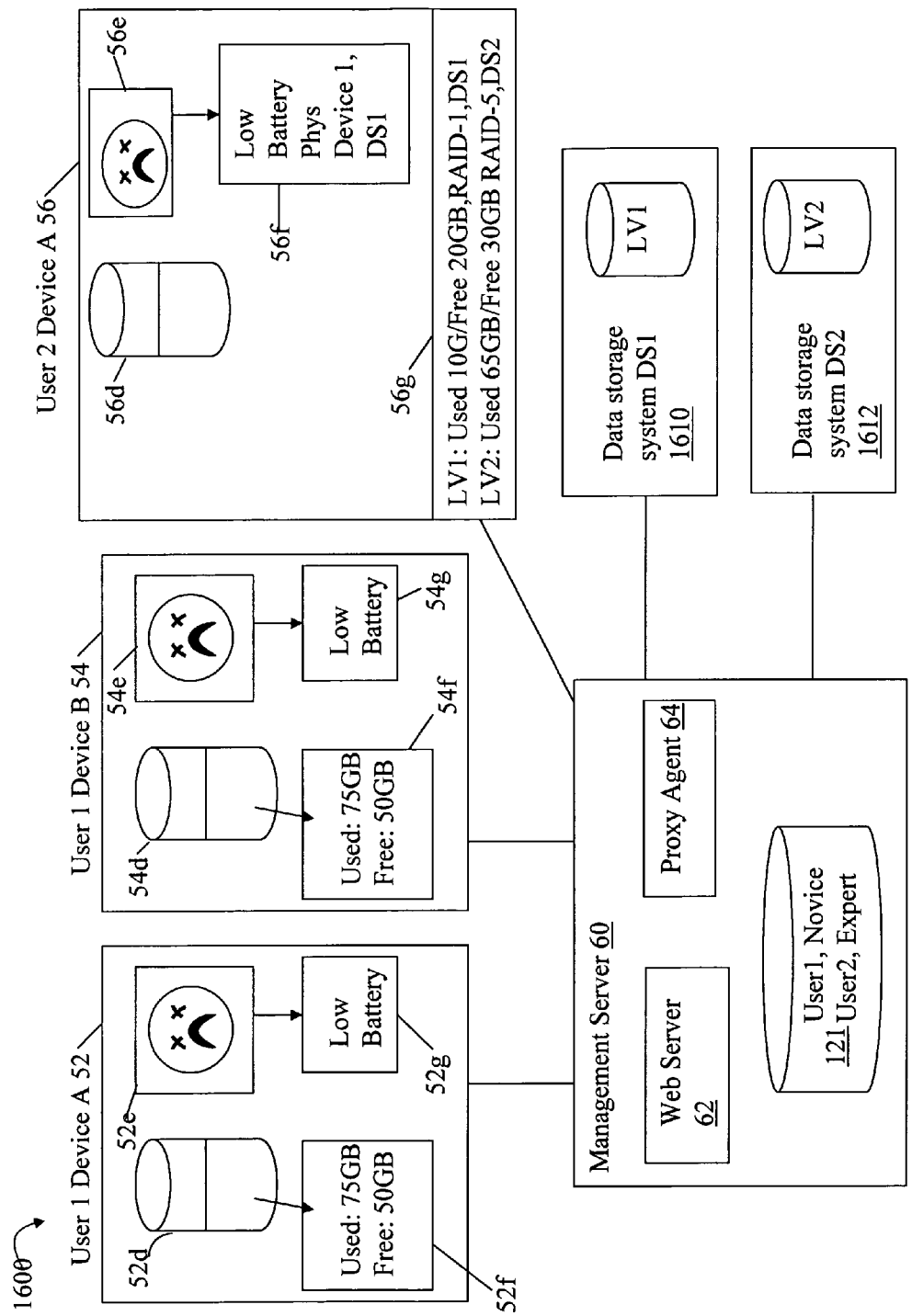

Referring to FIG. 20, shown is an example illustrating use of techniques herein for data storage management. The example 1600 includes devices 52 and 54 of user 1 and device 56 of user 2. User 1 may perform data storage management in accordance with techniques herein using both devices 52 and 54. User 2 may perform data storage management in accordance with techniques herein using device 56. Each of the devices 52, 54 and 56 include an integrated UI framework although omitted from the example 1600 for simplicity of illustration. Gadgets 52d and 52e may be installed on device 52. Element 52f may represent additional information displayed such as in response to a user right-clicking a mouse button on gadget 52d. Element 52g may represent additional information displayed such as in response to a user right-clicking a mouse button on gadget 52e. Gadgets 54d and 54e may be installed on device 54. Element 54f may represent additional information displayed such as in response to a user right-clicking a mouse button on gadget 54d. Element 54g may represent additional information displayed such as in response to a user right-clicking a mouse button on gadget 54e. Gadgets 56d and 56e may be installed on device 56. Element 56f may represent additional information displayed such as in response to a user right-clicking a mouse button on gadget 56e. Element 56g may represent additional information displayed in a bottom portion of the device display such as in response to a user right-clicking a mouse button on gadget 56d.

The example 1600 also includes management server 60 and also data storage systems 1610 and 1612 being managed by user 1 and user 2. The server 60 may include components similar to that as described above in connection with FIG. 1A. The data container 121 includes user information for user1 and user 2. For simplicity of illustration of this example, only a user level is specified for each user although, as described herein, user information of 121 may also include additional information for each user. As indicated by 121, user 1 is a novice or first level of expertise and user 2 is an expert or second level of expertise (e.g. indicating that user 2 has a higher level of sophistication, expertise or greater working knowledge than user 1). The proxy agent 64 may obtain information regarding the state of the systems 1610 and 1612 which is processed by the management server 60. Such processing includes retrieving user information from 121 and accordingly customizing the information for the UI for each of user 1 and user 2. In accordance with techniques herein, the data storage system state information may be processed for a novice UI and transmitted to device 52 and/or device 54 for user 1. When transmitted to device 52, such information may be displayed using gadgets 52d and 52e. When transmitted to device 54, such information may be displayed using gadgets 54d and 54e. In a similar manner, the state information may be processed for an expert UI and presented to device 56 for user 2. When transmitted to device 56, such information may be displayed using gadgets 56d and 56e.

Gadgets 52d, 54d and 56d may monitor and report information on data storage capacity and consumption. Gadgets 52e, 54e and 56e monitor and report information on general data storage system health. Since user 1 is a novice, all gadgets (52d, 52e, 54d and 54e) of devices 52 and 54 used by user 1 have a novice level UI. As indicated, for example, by 52d, an icon may be displayed using an image with a level indicator representing graphically an amount of storage that has been used within the systems 1610 and 1612.

Right-clicking a mouse or other selection device over the gadget 52*d* results in display of 52*f* indicating additional information about what storage is free and used. As indicated by 52*e*, an icon may be displayed using an image with a graphical indicator as to the general health of the data storage systems 1610, 1612. In this example 52*e*, the sad graphical display represents an unhealthy state such as when there is an alert or problem with a component of one or more of the systems 1610, 1612. Right-clicking a mouse or other selection device over the gadget 52*e* results in display of 52*g* indicating additional information about the unhealthy state (e.g., one of the backup power supplies has a low battery level). As illustrated, device 54 may include gadgets 54*d*, 54*e* providing a UI similar to that as described for device 52.

Since user 2 is an expert, gadgets 56*d* and 56*e* of device 56 have an expert level UI. As indicated, for example, by 56*d*, an icon may be displayed using an image with a level indicator representing graphically an amount of storage that has been used within the systems 1610 and 1612. Right-clicking a mouse or other selection device over the gadget 56*d* results in display of 56*g* indicating additional information about what storage is free and used. Since user2 is an expert, the information of 56*g* may be more detailed and appropriate for an expert level. For example, 56*g* provides information for each LV and also indicates the underlying RAID configuration for each LV. As indicated by 56*e*, an icon may be displayed using an image with a graphical indicator as to the general health of the data storage systems 1610, 1612. In this example 56*f*, the sad graphical display represents an unhealthy state such as when there is an alert or problem with a component of one or more of the systems 1610, 1612. Right-clicking a mouse or other selection device over the gadget 52*e* results in display of 52*g* indicating additional information about the unhealthy state. Element 56*f* (for an expert level) provides additional information in comparison to 52*g* (for a novice level).

Figure 21:
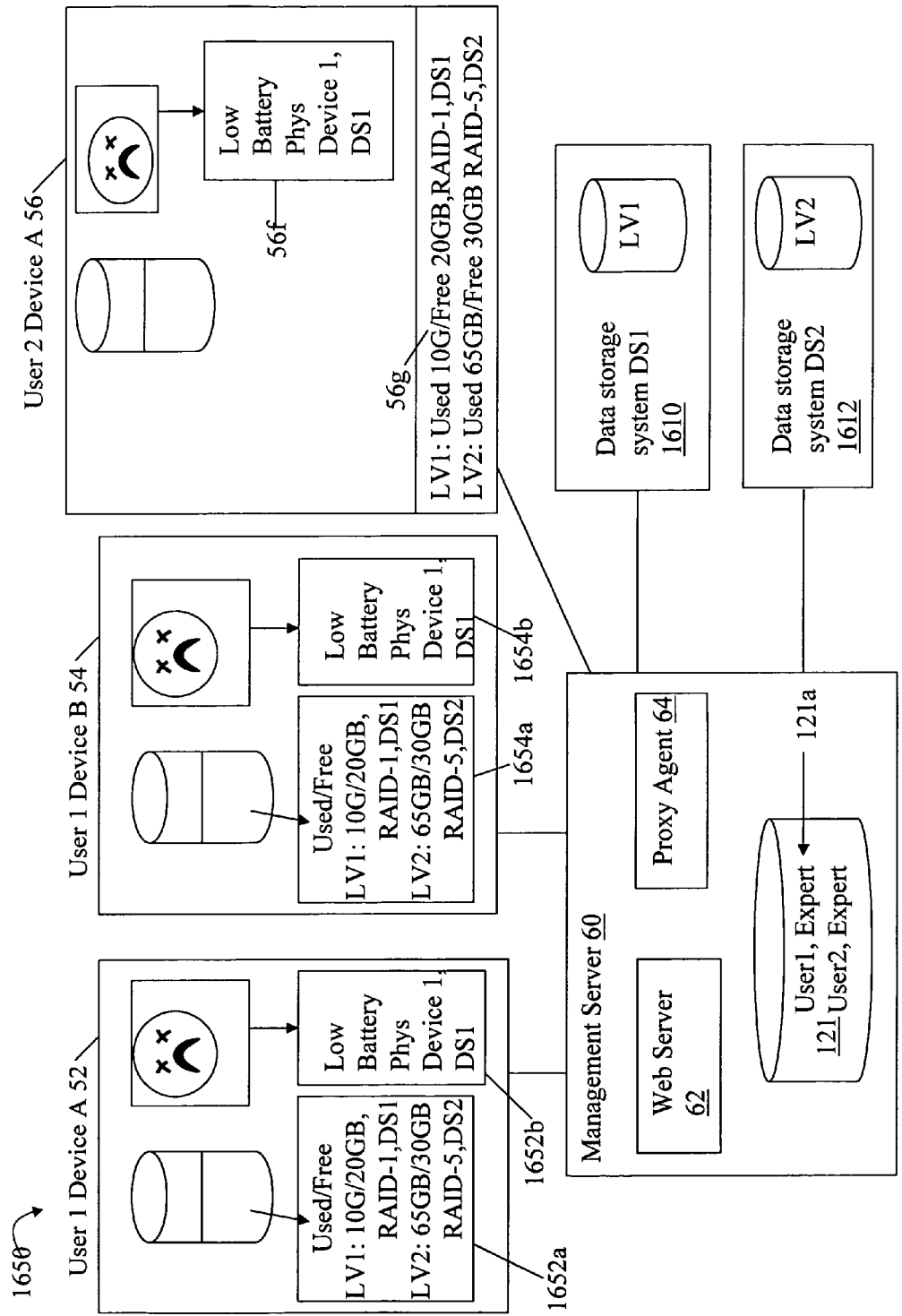

At a later point in time, user 1 becomes more skilled and is promoted or updated to an expert level. Referring to FIG. 21, shown is an example illustrating UIs of the devices for user 1 updated to the expert level. In this example 1650, the UI as provided by the gadgets on device 56 for user 2 are the same as in FIG. 20. However, since user 1 has been updated from the expert to novice level as indicated by 121*a*, the UIs of the devices 52 and 54 of user 1 have been accordingly updated as illustrated. In this case, the information of 1652*a*, 1652*b*, 1654*a* and 1654*b* is more detailed and appropriate for the expert level than, respectively, 52*f*, 52*g*, 54*f* and 54*g* of FIG. 20 (which is customized for the novice level). It should be noted that the same information or content is now presented to both user 1 and user 2. However, note that the form of the information displayed to user 2 in 56*g* differs from the form of 1652*a* and 1654*b*. This difference in form or presentation may vary, for example, due to customization options selected by each user, due to the fact that device 56 may use a different integrated UI framework than devices 52 and 54, due to the fact that device 56 may be a different device type than 52 and/or 54, and the like. In other words, form or presentation of the same UI content may vary with device, user customization options, and/or integrated UI framework. In connection with user1, all devices 52, 54 of user1 have their UIs accordingly updated automatically in response to the change in user1's level of expertise to expert.

Figure 22:
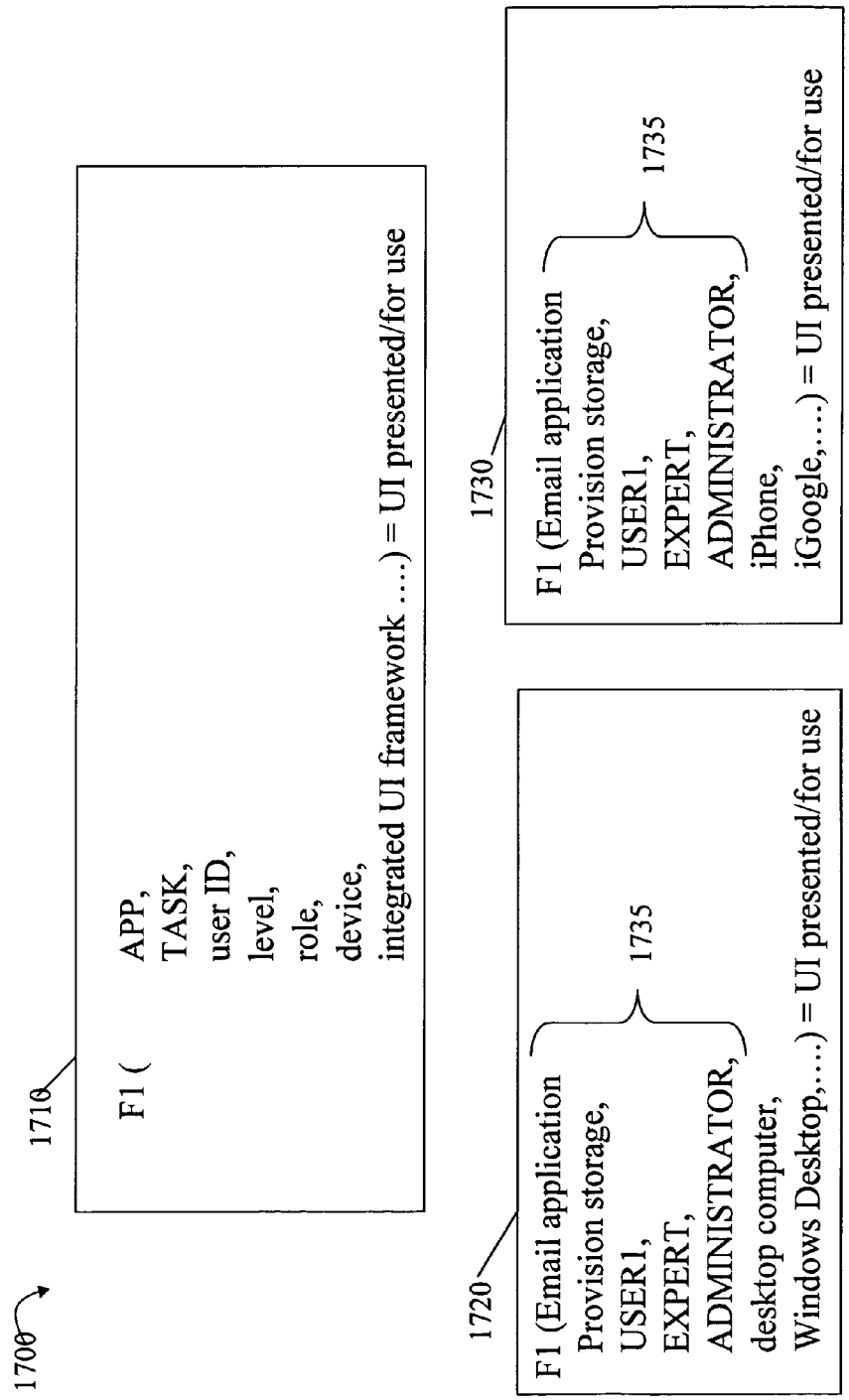
FIG. 22 is an general representation of how a UI may be determined in an embodiment using the techniques herein.

Referring to FIG. 22, shown is an example illustrating how a particular UI for a particular user may be determined in an embodiment in accordance with techniques herein. Element 1710 is a general representation of the foregoing. Elements 1720 and 1730 are examples of how a UI may be determined in connection with an instance of user information for USER1 having an EXPERT level and an ADMINISTRATOR role when provisioning storage for an email (electronic mail) application. The foregoing user information for USER1 (e.g., indicating EXPERT level, ADMINISTRATOR role) may be stored in a data container, such as 121 of FIG. 1A and used in connection with customizing a UI for any device and any integrated UI framework for USER 1. In other words, elements 1720 and 1730 are particular instances of the more general representation of element 1710. As represented by element 1720, the UI for USER1 is produced for a gadget included in the Windows Desktop on a desktop computing device. As represented by element 1730, the UI for USER1 is produced for a gadget included in the iGoogle framework or dashboard on an iPhone device.

Element 1710 represents how a UI, such as for use with a gadget in accordance with techniques herein, may be determined. It should be noted that, in a manner similar to that as illustrated in FIG. 7, the example 1700 provides a more general representation of how a UI may be customized and determined in an embodiment in accordance with techniques herein. Element 1710 includes a function F1 which may have one or more input parameters such as APP (application), TASK (task or operation type), user ID (identifying a particular user), level (identifying a level of expertise for the user ID) role (identifying a role for the user ID), device (identifying the device for with the UI is being generated), and integrated UI framework (of the device for which the UI is generated). In accordance with the example 1700, the same user information 1735 may be used in determining a UI for variations in device and integrated UI framework. With reference back to FIG. 1A, the information of 1735 may be stored as user information for user 1 in the data container 121.

Figure 23:
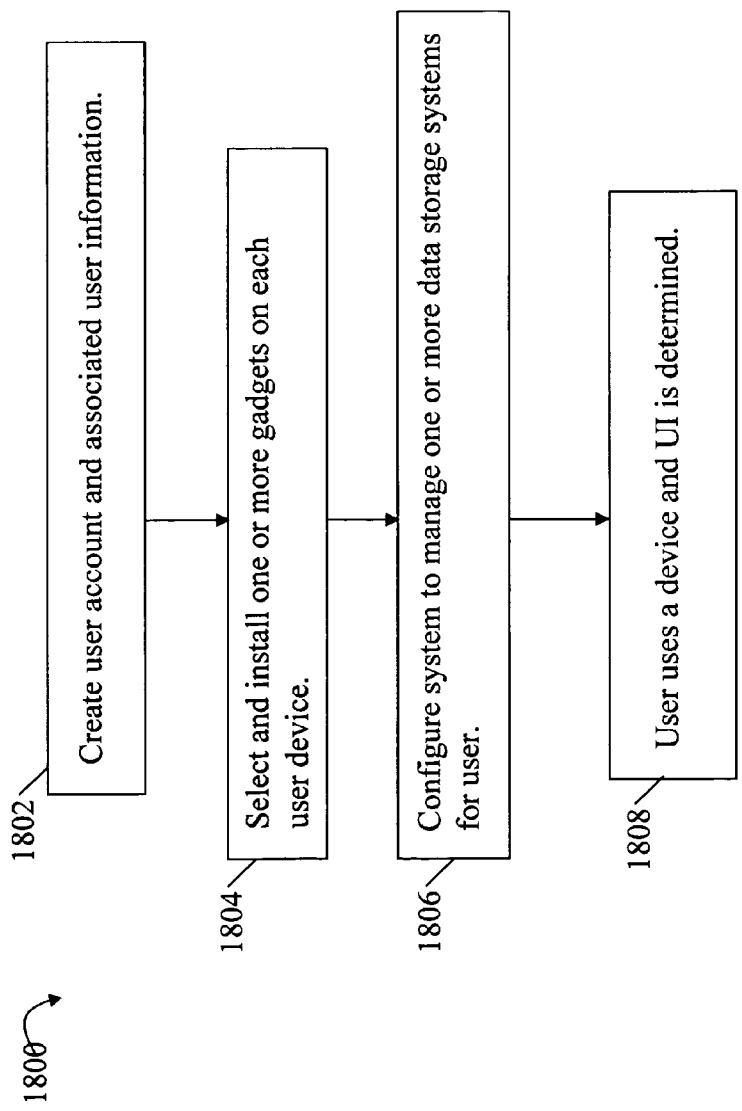
FIGS. 23 and 24 are flowcharts of processing steps that may be performed in an embodiment in accordance with techniques herein.
Figure 24:
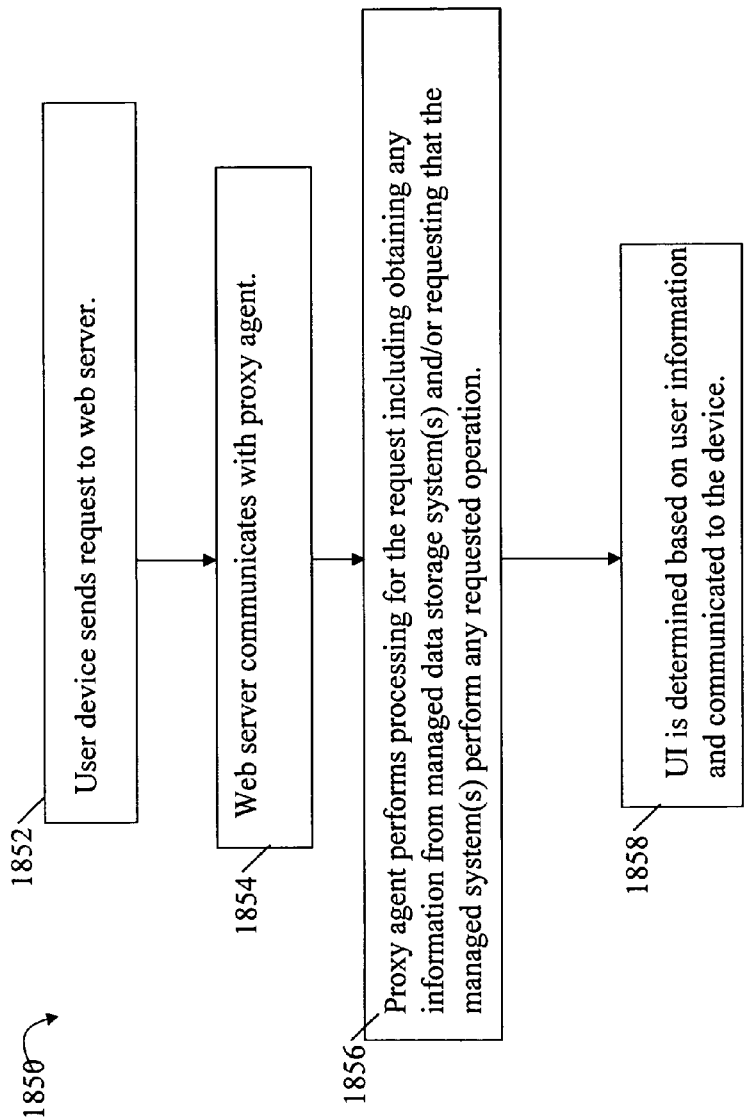

Referring to FIGS. 23 and 24, shown are flowcharts of processing steps as may be performed in an embodiment in accordance with techniques herein. The flowcharts 1800 and 1850 summarize processing described above. At step 1802, a user account and associated user information are created. The user account creation may include specifying a user identifier, password, user information such as user level, role, and the like, for the user. At step 1804, the user may select and install one or more gadgets on each device to be used, for example, for data storage management. At step 1806, processing is performed to configure components of the system described herein to manage one or more data storage systems for the user from the one or more specified user devices. Step 1806 may include, for example, providing addresses (e.g., IP addresses) of the managed data storage systems to the proxy agent, identifying the user devices to the proxy agent, and the like. At step 1808, some time later, the user logs on using one of the devices and a UI is determined for an installed gadget on the device. The UI may be determined in accordance with techniques as described herein. For example, information of the managed systems may be obtained using the proxy agent and such information may be processed to generate a UI customized in accordance with user information specified in step 1802.

The flowchart 1850 of FIG. 24 sets forth processing steps regarding communications exchanged in accordance with techniques herein. At step 1852, a user device sends a request to a web server, such as may be included in the management server of FIG. 1A. The request may be, for example, a request to retrieve information for the UI, a request to perform an operation such as when a user makes a menu selection of a displayed gadget menu, and the like.

Thus, the request may generally be to retrieve information for display (e.g., of the managed system(s)) and/or to perform an operation (e.g., perform a management operation on the managed system(s)). At step 1854, the web server communicates the request to the proxy agent. In step 1856, the proxy agent performs processing for the request. Such processing may include, for example, obtaining any information from the managed system(s) and/or requesting that the managed system(s) perform any requested operation. At step 1858, the UI is determined based on the user information (e.g, user level, role, etc.) and communicated to the user device. The UI may include content in accordance with status information retrieved from the managed systems, an updated data storage system status based on performing a requested operation, and the like. Step 1858 may include the UI being communicated to the gadget on the user device.

In accordance with techniques herein, an embodiment may perform data storage management from a device using a gadget included in an integrated UI framework. The gadget may be used to display a UI for user interactions including displaying information and menus, obtaining menu selections and parameter values, and the like. The UI may be customized in accordance with user information such as, for example, user level of expertise, role, and/or other criteria described herein. Particular examples of gadgets, frameworks, and functionality are described herein for purposes of example. For example, gadgets may be used to display managed data storage system status information such as regarding managed system health, storage capacity (used and free) of particular devices, and the like. A gadget may indicate when storage is low. Depending on the user level, additional information may be displayed such as how to add new devices, where to obtain additional storage, types of devices that can be added, connection to vendor internet sites where such devices can be purchased, training, publications, internet forums or user groups on adding storage devices, and the like. Such additional information may be displayed in accordance with, and may also vary with, level of expertise and/or role for the user, may vary with the particular application(s) for which the user performs data storage management, may vary with the particular task(s) or operations the user can perform, and the like. Training, educational information and/or other information may also be displayed for the appropriate user level or expertise, application for which data storage management is performed, and the like. The forgoing are some examples of customized information that may be included in a UI such as for use with a gadget in accordance with techniques herein. Also described herein are techniques for adjusting an expertise level for a particular user such as promoting or upgrading a user's level of expertise based on operations performed. Such promotion of user expertise level may be performed manually or automatically. The techniques herein provide for such changes to user level of expertise across all devices for a particular user and across a variety of different integrated UI frameworks that may be used on the various devices. The techniques herein provide for performing data storage system management using such devices while also having the benefit of varying the level of user expertise for the variety of different integrated UI frameworks on such devices.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for data storage management comprising:
   obtaining, by a proxy agent, information regarding a state of one or more data storage systems being managed;
   communicating said information from said proxy agent to a first gadget for data storage management on a first device used by a first user, said first gadget being included in an integrated user interface framework; and
   providing, using the first gadget and said information, a first user interface that is customized for display on the first device for the first user, wherein said first user interface is determined in accordance with first parameters including parameters identifying the first device and the integrated user interface framework of the first device, wherein the integrated user interface framework is a customizable computing environment, wherein said proxy agent performs first processing that determines customized user interface content for a plurality of supported integrated user interface frameworks and for a plurality of electronic devices including the first device, said plurality of supported integrated user interface frameworks including the integrated user interface framework, wherein each of the plurality of supported integrated user interface frameworks is used to customize a user interface on at least one of the plurality of electronic devices, said plurality of electronic devices including a computer system and a mobile phone, wherein each of the plurality of supported integrated user interface frameworks provides for retrieving selected content from a plurality of disparate electronic sources including at least one network location that is external from said each supported integrated user interface framework.

2. The method of claim 1, further comprising:
   communicating said information from said proxy agent to a second gadget for data storage management on a second of the plurality of electronic devices, said second gadget being included in a second of the plurality of supported integrated user interface frameworks.

3. The method of claim 2, wherein said first device is used by the first user having a first level of expertise and said second device is used by a second user having a second level of expertise different from said first level.

4. The method of claim 3, further comprising:
   selecting a first portion of the information in accordance with the first level of expertise and said first device; and
   providing, using said first gadget, the first user interface on the first device, said first user interface including said first portion of the information and one or more options in accordance with the first level of expertise.

5. The method of claim 4, further comprising:
   selecting a second portion of the information in accordance with the second level of expertise and said second device; and
   providing, using said second gadget, a second user interface on the second device, said second user interface including said second portion of the information and one or more options in accordance with the second level of expertise.

6. The method of claim 1, further comprising:
installing said first gadget in the integrated user interface framework on said first device; and
configuring said proxy agent and said first gadget to manage said one or more data storage systems, said configuring including providing said proxy agent with an address for each of said one or more data storage systems being managed, configuring said first gadget to communicate with said proxy agent by providing said first gadget with an address of a component on which said proxy agent is located, and determining an initial level of expertise for the first user of said first device.

7. The method of claim 1, wherein the first user uses a multiple ones of the plurality of devices including said first device, each of said multiple ones of the plurality of devices using a different one of the plurality of supported integrated user interface frameworks including a gadget installed thereon for data storage system management of said one or more data storage systems, said gadget of each of multiple ones of said plurality of devices configured to communicate with said proxy agent, and the method further comprising:
storing, in a data container, user information indicating that said first user has a first level of expertise; and
providing, for each of said multiple ones of the plurality of devices using the gadget of said each device, a customized user interface for the first user in accordance with the first level of expertise and said each device.

8. The method of claim 7, further comprising:
updating said user information to indicate that said first user has a second level of expertise; and
providing, for each of said multiple ones of the plurality of devices using the gadget of said each device, a customized user interface for the first user in accordance with the second level of expertise.

9. The method of claim 1, wherein said proxy agent is included on a server.

10. The method of claim 1, wherein said proxy agent is included on at least a first of the one or more data storage systems.

11. The method of claim 10, wherein said first gadget is included in a directory on one of said data storage systems.

12. The method of claim 3, further comprising:
updating a current expertise level for said first user from said first level of expertise to said second level of expertise; and
in response to said updating the current level of expertise, automatically updating said first user interface on the first device in accordance with the second level of expertise.

13. The method of claim 12, wherein said first user interface is updated in accordance with said second level of expertise to include at least one of additional information, a new menu, and a new menu option not otherwise included in said first user interface in accordance with said first level of expertise.

14. The method of claim 1, wherein said integrated user interface framework provides a customized and integrated view of information for a user of said first device.

15. The method of claim 14, wherein said integrated user interface framework is any of a customizable computing desktop environment, a customizable web page portal, a customizable application interface, and a customizable device user interface.

16. The method of claim 4, wherein said first user interface is further customized in accordance with at least one of an application for which data storage system management is performed and an operation or task for which data storage system management is performed.

17. The method of claim 4, wherein said first user interface varies in accordance with first user information for said first user, said first user information including said first level of expertise, a role associated with said first user, an application for which said first user performs data storage management, and a task or operation which said first user has permission to perform.

18. A system comprising:
one or more data storage systems;
a first device having a first processor and including a first integrated user interface framework having a first plurality of gadgets installed thereon, said first plurality of gadgets including a first gadget for data storage management of said one or more data storage systems;
a second device having a second processor and including a second integrated user interface framework having a second plurality of gadgets installed thereon, said second plurality of gadgets including a second gadget for data storage management of said one or more data storage systems;
a computer readable medium including executable code stored thereon for a proxy agent that communicates with said one or more data storage systems, communicates with said first device, and communicates with said second device; and
a memory comprising a data container of user information for a plurality of users, said user information for a first of said plurality of users including a level of expertise of said first user, wherein said proxy agent provides a first user interface to said first gadget for said first user when said first user uses said first device, wherein said first user interface is customized for display on the first device for the first user and is determined in accordance with first parameters including parameters identifying the first device, the first integrated user interface framework that is a customizable computing environment, and said level of expertise of the first user, and wherein said proxy agent provides a second user interface to said second gadget for said first user when said first user uses said second device, wherein said second user interface is customized for display on the second device for the first user and is determined in accordance with second parameters including parameters identifying the second device, the second integrated user interface framework, and said level of expertise of the first user, wherein said proxy agent performs first processing that determines customized user interface content in an associated form or presentation for a plurality of electronic devices and a plurality of supported integrated user interface frameworks, said plurality of electronic devices including the first device and the second device, the plurality of supported integrated user interface frameworks including the first integrated user interface framework and the second integrated user interface framework, wherein each of the plurality of supported integrated user interface frameworks is used to customize a user interface on at least one of the plurality of electronic devices, said plurality of electronic devices including a computer system and a mobile phone, wherein each of the plurality of supported integrated user interface frameworks provides for retrieving selected content from a plurality of disparate electronic sources including at least one network location that is external from said each supported integrated user interface framework.

19. The system of claim 18, wherein said one or more data storage systems include a data storage array.

20. A non-transitory computer readable medium comprising code stored thereon that, when executed, performs a method for data storage management comprising:
obtaining, by a proxy agent, information regarding a state of one or more data storage systems being managed;
communicating said information from said proxy agent to a first gadget for data storage management on a first device used by a first user, said first gadget being included in an integrated user interface framework; and
providing, using the first gadget and said information, a first user interface that is customized for display on the first device for the first user, wherein said first user interface is determined in accordance with first parameters including parameters identifying the first device and the integrated user interface framework of the first device, wherein the integrated user interface framework is a customizable computing environment, wherein said proxy agent performs first processing that determines customized user interface content for a plurality of supported integrated user interface frameworks and for a plurality of electronic devices including the first device, said plurality of supported integrated user interface frameworks including the integrated user interface framework, wherein each of the plurality of supported integrated user interface frameworks is used to customize a user interface on at least one of the plurality of electronic devices, said plurality of electronic devices including a computer system and a mobile phone, wherein each of the plurality of supported integrated user interface frameworks provides for retrieving selected content from a plurality of disparate electronic sources including at least one network location that is external from said each supported integrated user interface framework.

* * * * *